US010546583B2

(12) United States Patent
White et al.

(10) Patent No.: US 10,546,583 B2
(45) Date of Patent: Jan. 28, 2020

(54) CONTEXT-BASED DEVICE ARBITRATION

(71) Applicant: Amazon Technologies, Inc., Seattle, WA (US)

(72) Inventors: Joseph White, San Francisco, CA (US); Ravi Kiran Rachakonda, San Jose, CA (US); Vinodth Kumar Mohanam, Sunnyvale, CA (US); Lalithkumar Rajendran, San Jose, CA (US); Deepak Uttam Shah, Milpitas, CA (US); Maziyar Khorasani, San Francisco, CA (US); Venkata Snehith Cherukuri, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 15/691,460

(22) Filed: Aug. 30, 2017

(65) Prior Publication Data
US 2019/0066670 A1 Feb. 28, 2019

(51) Int. Cl.
G10L 15/26 (2006.01)
G10L 15/22 (2006.01)
G10L 25/84 (2013.01)
G10L 15/18 (2013.01)
G10L 15/28 (2013.01)

(52) U.S. Cl.
CPC .......... G10L 15/22 (2013.01); G10L 15/1815 (2013.01); G10L 15/28 (2013.01); G10L 25/84 (2013.01); G10L 2015/223 (2013.01)

(58) Field of Classification Search
None
See application file for complete search history.

(56) References Cited

U.S. PATENT DOCUMENTS

| 9,875,081 | B2 * | 1/2018 | Meyers | G10L 15/063 |
|---|---|---|---|---|
| 9,972,339 | B1 * | 5/2018 | Sundaram | G10L 17/04 |
| 10,134,421 | B1 * | 11/2018 | Sundaram | G10L 17/04 |
| 2015/0370531 | A1 * | 12/2015 | Faaborg | G06F 3/167 |
| | | | | 704/275 |
| 2017/0025124 | A1 * | 1/2017 | Mixter | G10L 15/32 |
| 2017/0076720 | A1 * | 3/2017 | Gopalan | G06F 3/167 |

OTHER PUBLICATIONS

The PCT Search Report and Written Opinion dated Oct. 31, 2018 for PCT Application No. PCT/US2018/047062, 12 pages.

* cited by examiner

Primary Examiner — Satwant K Singh
(74) Attorney, Agent, or Firm — Lee & Hayes, P.C.

(57) ABSTRACT

This disclosure describes, in part, context-based device arbitration techniques to select a voice-enabled device from multiple voice-enabled devices to provide a response to a command included in a speech utterance of a user. In some examples, the context-driven arbitration techniques may include determining a ranked list of voice-enabled devices that are ranked based on audio signal metric values for audio signals generated by each voice-enabled device, and iteratively moving through the list to determine, based on device states of the voice-enabled devices, whether one of the voice-enabled devices can perform an action responsive to the command. If the voice-enabled devices that detected the speech utterance are unable to perform the action responsive to the command, all other voice-enabled devices associated with an account may be analyzed to determine whether one of the other voice-enabled devices can perform the action responsive to the command in the speech utterance.

20 Claims, 8 Drawing Sheets

CONTEXT-BASED DEVICE ARBITRATION

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands, including desktops, tablets, entertainment systems, and portable communication devices. In some instances, multiple of these voice-enabled computing devices may be in proximity to a user to such that each voice-enabled computing device detects a voice command from the user. Each of the voice-enabled devices may detect the voice command and process the voice command to perform the task for the user. This may result in multiple voice-enabled devices performing a same task for a user, which ultimately creates an undesirable user experience.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
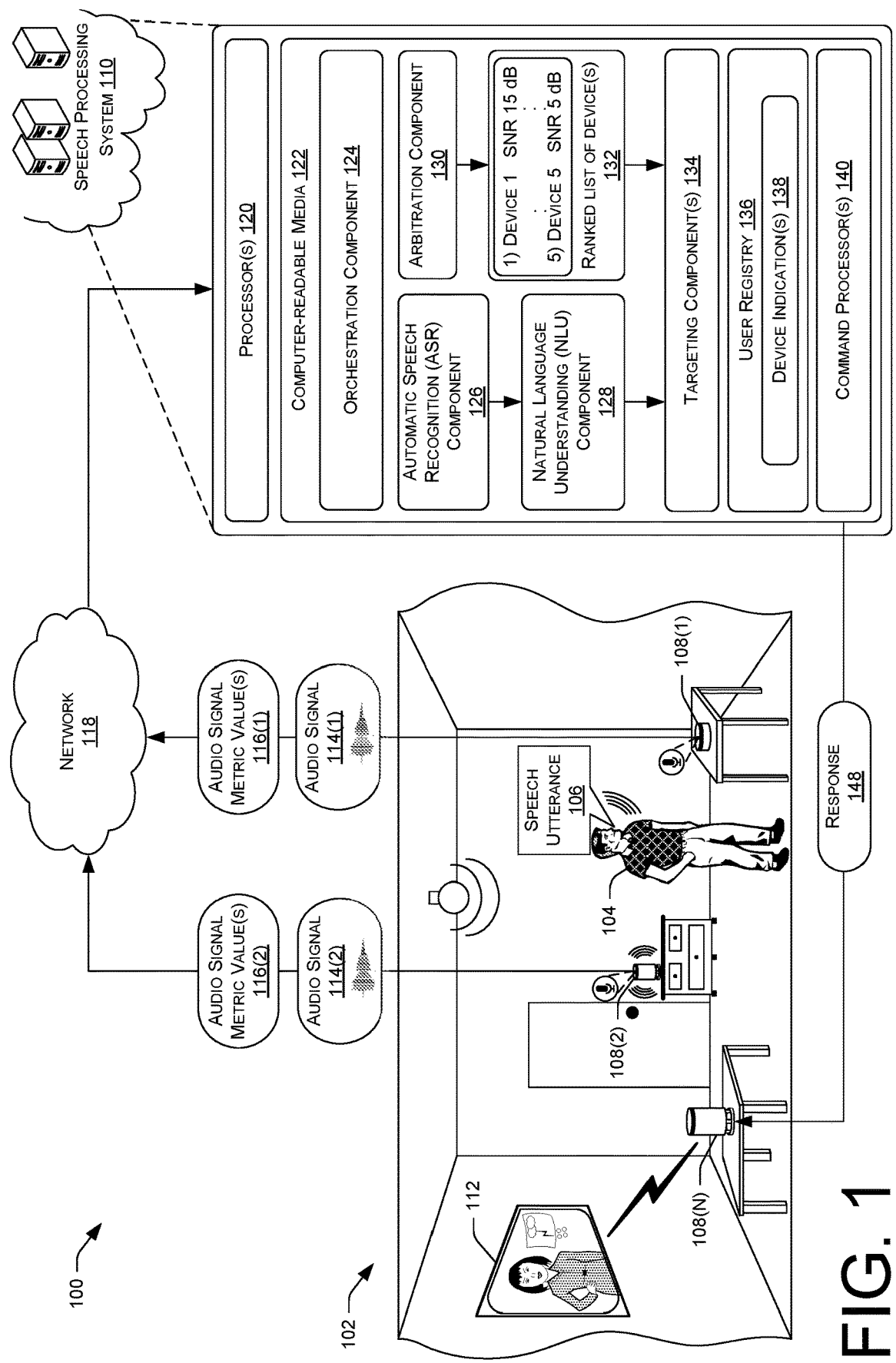
FIG. 1 illustrates a schematic diagram of an illustrative environment in which a user issues a speech utterance, multiple voice-enabled devices detect the speech utterance, and a speech processing system performs arbitration to determine which voice-enabled devices will respond to the speech utterance.

With the proliferation of voice-enabled computing devices, or "voice-enabled devices," users are able to interact with more of their computing devices through speech. For instance, a user may issue a command via a speech utterance to a voice-enabled device to perform an operation, such as turning on/off an appliance, streaming music, performing a telephone call, etc. Due to the usefulness of these voice-enabled devices, users often have multiple devices in an environment, such as their home. While multiple voice-enabled devices may increase user satisfaction by allowing a user to issue speech utterances including commands throughout their home, in situations in which multiple voice-enabled devices are near each other, such as within a single room or in adjoining rooms, each of the voice-enabled devices may receive the user utterance and each device may independently attempt to process and respond to the user utterance as if it were two separate utterances. In some examples, a voice-enabled device might be selected from among the multiple voice-enabled devices to provide a response to an utterance using fairly limited types of data. For example, a voice-enabled device may be selected by analyzing and comparing various audio signal metric values for audio signals generated by each voice-enabled device which represent the speech utterance, such as signal amplitudes, or signal-to-noise ratios for each of the audio signals generated by each voice-enabled device.

This disclosure describes, at least in part, techniques for using contextual information to perform device arbitration to select the most appropriate voice-enabled device, from among multiple voice-enabled devices, to perform an action responsive to a command included in the speech utterance. In some examples, the arbitration techniques used to select a voice-enabled device to respond to a speech utterance may be driven by varying types of contextual information. For instance, the contextual information may include information associated with the speech utterance detected by the multiple voice-enabled devices (e.g., signal-to-noise ratios, proximity of the user to each voice-enabled device, an intent of the user who issued the utterance, etc.) an intent of the speech utterance, the current device states (e.g., conducting a telephone call, outputting an alarm sound, etc.), or other types of contextual information.

To perform contextually driven device arbitration, voice-enabled devices are often configured with various sensors and components for collecting different types of data, or metadata, which may be useful in selecting a voice-enabled device to perform an operation which is responsive to a user's speech utterance. For example, the voice-enabled devices may each include microphones configured to generate audio signals representing the speech utterance issued by the user. The voice-enabled devices may be configured with components to determine various types of audio signal metric values which indicate characteristics of an audio signal, such as a signal-to-noise ratio, a spectral centroid measure, a speech energy level, a spectral flux, a particular percentile frequency, a clarify, a harmonicity, the level of voice presence detected in the audio signal, an amplitude of the audio signal, etc.

In some instances, components of the voice-enabled devices may be configured to determine a "device state" (e.g., device state data) of the voice-enabled devices when the speech utterance was issued. Device states may generally correspond to what activities the voice-enabled devices were performing when the speech utterance was issued. For instance, a device state may include voice-enabled devices performing a phone call, streaming music, causing an alarm to go off (e.g., kitchen timer), etc. Accordingly, voice-enabled devices may be configured with various sensors and components for generating audio signals representing a speech utterance, and for collecting metadata which provides context surround the voice-enabled devices when the speech utterance was detected.

While voice-enabled devices may perform some types of pre-processing, often voice-enabled devices may have relatively low functionality. For instance, voice-enabled devices may comprise battery powered devices which are configured to merely serve as an interface or "middle man" between a remote server, or system, and a user. In this way, the more intensive processing involved in the arbitration techniques may be performed using large amounts of resources of remote services, which may extend battery life performance of voice-enabled devices. For example, while the voice-enabled devices may be configured with components for determining some or all of the audio signal metric values described herein, in some examples the voice-enabled devices may relay the audio signals to a speech processing system which performs processing techniques on the audio signals to determine some or all of the audio signal metric values.

Thus, in some examples, some or all of the arbitration techniques may be performed by a speech processing system (e.g., "cloud-based service," "software as a service (SaaS)," "network accessible platform," etc.) which receives data from the voice-enabled devices. Each of the voice-enabled devices may access the speech processing system through a communications network, such as the internet, to provide the speech processing system with the captured audio signals and the various types of contextual information detected or determined by the voice-enabled devices. In various examples, the voice-enabled devices may receive a "wake" trigger (e.g., wake word, button input, etc.) which indicates to the voice-enabled devices that a user is speaking a command, and the voice-enabled devices begin streaming metadata, audio signal metric values, and the audio signals representing the spoken command to the network-based speech service.

As noted above, the speech processing system may include one or more components to perform device arbitration between multiple voice-enabled devices to select a particular voice-enabled device to respond to a speech utterance. For example, an arbitration component may perform various techniques for arbitrating between multiple voice-enabled devices which detected and/or captured a speech utterance of a user. In some examples, the arbitration component may receive audio signal metric values (e.g., signal-to-noise ratios) from each of the voice-enabled devices, rank the voice-enabled devices based on the audio signal metric values, and based on the rankings, select voice-enabled device to perform an action responsive to a command included in the speech utterance. By using audio signal metric values for audio signals received from each of the voice-enabled devices, the arbitration component may select a device nearest the user, or a device that the user is speaking towards. However, in some examples selecting a voice-enabled device to respond to a user command based on the device being the nearest device to the user may result in an inappropriate device performing the response to the command. For example, a user may be in their living room streaming audio through a voice-enabled device in their living room, and a voice-enabled device in their kitchen may begin outputting an alarm sound. If the user issues a voice command of "please stop" to stop the alarm sound, the arbitration component of the speech processing system may cause the voice-enabled device in the living room to stop streaming the audio, although the user intended for the voice-enabled device in the kitchen to stop outputting the alarm sound.

In some examples, the speech processing system may use additional contextual data to determine a device to respond to the command in the speech utterance. For example, an orchestration component of the speech processing system may call an automated speech recognition (ASR) component of the speech processing system to process one or more of the audio signals received from the voice-enabled devices using automated speech recognition to generate text data representing the speech utterance. Further, the orchestration component may call a natural language understanding (NLU) component to process the text data representing the speech utterance using natural language understanding to determine an intent (e.g., intent data) expressed by the user in the speech utterance. For example, if the user issued a command to "please stop," the NLU component may determine that the user's intent is to have a voice-enabled device quit performing a task (e.g., performing a phone call, streaming audio, outputting an alarm sound, etc.).

Further, the speech processing system may use contextual data such as device states of each of the voice-enabled devices to determine a device to respond to the command in the speech utterance. The speech processing system may track and maintain indications of device states for voice-enabled devices associated with user and/or household accounts. For instance, when a user requests that the speech processing system set an alarm on a kitchen voice-enabled device, the speech processing system may store an indication, upon receiving the request, that the kitchen voice-enabled device has an alarm counting down. As another example, if a user requests that a living room voice-enabled device link to a phone of the user and conduct a phone call, the speech processing system may store an indication that the living room voice-enabled device is conducting a phone call until a command to end the phone call is received.

In various examples, a targeting component of the speech processing system may determine, based on the various contextual data, which voice-enabled device associated with an account of a user who issued a command in a speech utterance is to respond to the command. The targeting component may receive and/or identify contextual data including, but not limited to, (i) the ranked list of voice-enabled devices who detected the speech utterance that are ranked by the arbitration component based on one or more audio signal metric values, (ii) the intent (e.g., intent data) expressed by the user in the speech utterance, and (iii) the device states of the voice-enabled devices associated with the user account. To determine which voice-enabled device is to respond to the command in the speech utterance, the targeting component of the speech processing system may iteratively analyze each of the voice-enabled devices using one or more rules.

In some examples, the targeting component may initially determine, using a first rule, whether the top ranked voice-enabled device ("source device") in the ranked list is capable of responding to the command in the speech utterance. The targeting component may analyze the intent expressed in the speech utterance, as well as the device state, to determine whether the source device is capable of responding to the command in the speech utterance. For example, if the speech utterance is to "please stop," the intent may map to devices states which are capable of "stopping" their device state, such as device states of steaming audio, conducting a phone call, outputting an alarm sound, etc. Using the first rule, if the intent of the speech utterance maps to the device state of the source device, or is "relevant" to the device state of the source device, the targeting component may determine that the source device is capable of performing the response to the command and select the source device as the voice-enabled device that is to respond to the command in the speech utterance ("target device").

Alternatively, if the intent expressed in the speech utterance does not map to the device state of the source device, the targeting component may proceed to a second rule and determine if the source is device is part of a device "cluster of devices" that has a device state to which the intent maps, or otherwise corresponds. A cluster of devices may correspond to a virtual representation or indication of a group of voice-enabled devices which are synchronized to perform the same action in concert. For instance, the cluster of devices may include multiple voice-enabled devices and/or secondary devices which are outputting the same audio stream in a uniform fashion such that the different audio streams, which correspond to the same audio content, being output by each of the voice-enabled devices is in sync with each other. The cluster of devices may be stored as a virtual representation such that all of the voice-enabled devices in the cluster appear to be a single device from the perspective of the targeting component. Accordingly, in a similar fashion to the first rule, the targeting component may determine whether the cluster of devices can respond to the command in the speech utterance. If the intent of the speech utterance maps to the device state of the cluster of devices, or is "relevant" to the device state of the cluster of devices, the targeting component may determine that the cluster of devices can perform the response to the command and select the cluster of devices as the target device.

Alternatively, if the targeting component determines that the source device is not included in a cluster of devices, or if the cluster of devices in which the source device is included is not capable of performing the respond to the command in the speech utterance, the targeting component may apply a third rule and determine whether the source device is associated with a secondary device that is capable of performing the response to the command. As described herein, a secondary device may comprise a device that is controlled, or otherwise associated with, a voice-enabled device. Generally, secondary devices are not voice-enabled. For example, types of secondary devices may include, but are not limited to, televisions, lamps/lights, garage doors, door locks, thermostats, garbage disposals, etc. Under the third rule, if the targeting component determines that the source device is associated with a secondary device, the targeting component may determine under the third rule whether the intent maps to a device state of the secondary device. If the targeting component determines that the secondary device is capable of performing the response to the command, the targeting component may select the source device as the target device. For example, if the source device is associated with a secondary device, such as controlling a television based on voice commands from a user, and the command is "next channel," the targeting component may select the source device as the target device because the secondary device with which the source device is associated is capable of performing the command in the speech utterance.

However, if the source device is not associated with a secondary device, or if the secondary device with which the source device is associated is not capable of performing the command, the targeting component may determine that the source device is not the target device. Upon determining that the source device is not the target device, the targeting component may iteratively use the above described rules to determine whether the other voice-enabled devices indicated in the ranked list are the target device. The targeting component may move through the ranked list of devices in order to determine whether any of the voice-enabled devices which detected the speech utterance are the target device.

In some examples, the targeting component may determine that the target device is not included in the ranked list of voice-enabled devices which detected the speech utterance. In this case, the targeting component may identify all other voice-enabled devices associated with the user and/or household account that did not detect the speech utterance. The targeting component may then determine whether the intent expressed in the speech utterance maps to, or is otherwise associated with, any of the remaining voice-enabled devices. If the intent maps to a device state of a voice-enabled device, the targeting component may select that voice-enabled device as the target device. However, if none of the other voice-enabled devices are capable of performing the response to the command, the targeting component may designate the source device as the target device.

Thus, the techniques described herein include analyzing contextual data using various rules for to determine which voice-enabled device is intended and/or capable of responding to a command issued in a speech utterance of a user.

Once the targeting component has determined the target device, the targeting component may provide an indication of the target device to a command processor. The command processor may use the intent and the indication of the target device to determine a response for the processed speech utterance. For instance, the command processor may work in conjunction with one or more speechlets that are configured to determine a response for the processed query, determine locations of relevant information for servicing a request from the user and/or generate and store the information if it is not already created, as well as route the identified intents to the appropriate destination command processor. The destination command processor may be determined based on the intent determined using the NLU. For example, if the NLU output includes a command to play music (play music intent), the destination command processor may be a music playing application, such as one located on the target voice-enabled device, or in a music playing appliance, configured to execute a music playing command. The command processor may then cause the determined command to be sent to the target device to cause the target device to perform the appropriate response for the command.

Using the techniques described above, and in more detail below with respect to the figures, a speech processing system may analyze audio signals, as well as additional contextual metadata, for voice-enabled devices and perform techniques to select an appropriate voice-enabled device to respond to a speech utterance from amongst multiple voice-enabled devices. Conventionally, a voice-enabled device may have been selected because the speech utterance was detected as being louder at the voice-enabled device compared to the other voice-enabled devices which detected the speech utterance. However, without using context associated with each of the voice-enabled devices, as well as the speech utterance, the best, or at least better, suited voice-enabled device may not be selected to respond to the speech utterance. For example, if a user is in a bedroom which has a bedroom device, a kitchen device begins outputting an alarm sound, and the user issues a command to turn off the alarm, traditionally the bedroom device may be selected because the amplitude of the audio signal generated by the bedroom device is higher than the kitchen device. However, using the techniques described herein, context surrounding voice-enabled devices and speech utterances is analyzed for device arbitration to determine which voice-enabled device is best suited to respond to the speech utterance. Thus, the techniques described herein may solve a problem where multiple voice-enabled devices here the same wakeword and the subsequent voice command, even if the multiple voice-enabled devices are in different rooms, and attempt to independent process and response to the voice command. For instance, the intent of the voice command, the device states for each of the voice-enabled devices that hear the utterance, and indications of rankings of the voice-enabled device provided by the arbitration component may all be used in combination to select a voice-enabled device from a group of multiple voice-enabled devices to respond to the voice command.

In some examples, one or more of the above-noted processes may be performed in parallel to reduce latency time. For example, multiple voice-enabled devices may be analyzed in parallel to determine whether the devices are appropriate to be the target device. Further, a voice-enabled device may be analyzed using one or more of the rules (e.g., relevant device rule, cluster device rule, secondary device association rule, etc.) in parallel.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

EXAMPLE ARCHITECTURE

FIG. 1 illustrates a schematic diagram 100 of an illustrative environment 102 in which a user 104 issues a speech utterance 106, one or more voice-enabled devices 108(1)-(N) (collectively "voice-enabled devices 108") detect the speech utterance 106, and a speech processing system 110 having various components to determine which of the voice-enabled devices 108 responds to the speech utterance 106. The voice-enabled device 108(N) may further be associated with a secondary device 112, such as a television. The voice-enabled device 108(N) may be wirelessly connected (e.g., Bluetooth, ZigBee, etc.) with the secondary device 112, and the voice-enabled device 108(N) may control operations of the secondary device 112 using speech utterances 106 that are processed by the speech processing system 110.

The speech processing system 110 may process audio signals received from the voice-enabled devices 108 and formulate responses to the user 106 along with determining which of the voice-enabled devices 108 is to perform an action responsive to a command in the speech utterance 106. The speech processing system 110 may be implemented as one or more computing devices including one or more servers, desktop computers, laptop computers, or the like. In one example, the speech processing system 110 is configured in a server cluster, server farm, data center, mainframe, cloud computing environment, or a combination thereof. To illustrate, the speech processing system 110 may include any number of devices that operate as a distributed computing resource (e.g., cloud computing, hosted computing, etc.) that provides services, such as storage, computing, networking, and so on.

In some examples, the voice-enabled devices 108 may each have one or more microphones that are used to capture user speech, such as speech utterance 106, and one or more speakers that are used to play speech (e.g., dialogue) and content. In some embodiments, the voice-enabled devices 108 may be designed to operate from a fixed location, and in other embodiments, the voice-enabled devices 108 may be portable or mobile. For instance, the voice-enabled devices 108 may comprise handheld devices or other mobile devices, such as smartphones, tablet computers, media players, personal computers, wearable devices, various types of accessories, and so forth.

As shown in the environment 102, the user 104 is interacting with the voice-enabled devices 108 through a speech utterance 106. For example, the voice-enabled devices 108 may receive spoken commands from the user 104 via the speech utterance 106, and provide services in response to the commands. In some examples, the voice-enabled devices 108 may detect a predefined trigger expression or word (e.g., "awake"), which may be followed by instructions or directives (e.g., "please end my phone call," "please turn off the alarm," etc.). Services provided by the voice-enabled devices 108 in conjunction with the speech processing system 110 may include performing actions or activities, rendering media, obtaining, and/or providing information, providing information via generated or synthesized speech via the voice-enabled devices 108, initiating Internet-based services on behalf of the user 104, and so forth.

The voice-enabled devices 108 may receive or capture sound corresponding to the speech utterance 106 of the user via one or more microphones. In certain implementations, the speech utterance 106 may include or be preceded by a wakeword or other trigger expression or event that is spoken by the user 104 to indicate that subsequent user speech is intended to be received and acted upon by the voice-enabled devices 108 and/or speech processing system 110. The voice-enabled devices 108 may detect the wakeword and begin streaming audio signals to the speech processing system 110. In some instances, the voice-enabled devices 108 may operate in a low-functionality mode and analyze sound using ASR processing. When the wakeword is detected using ASR, the voice-enabled devices 108 may begin streaming the audio signal, and other data, to the speech processing system 110. The wakeword may be a reserved keyword that is detected locally by the voice-enabled devices 108, such as by using an expression detector that analyzed audio signals produced by the microphones of the voice-enabled devices 108 using ASR techniques to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In certain embodiments, an expression detector of the voice-enabled devices 108 may be configured to analyze the audio signal to produce a score indicating a likelihood that the wakeword is represented in the audio signal. The expression detector then compares the score to a threshold to determine whether the wakeword will be declared as having been spoken. For instance, the ASR techniques may involve using a Hidden Markov Model (HMM) recognizer that performs acoustic modeling of the audio signal and compares the HMM model of the audio signal to one or more reference HMM models that have been created by training for a specific trigger expression.

In the example illustrated in environment 102, the user 104 issues a speech utterance 106 subsequent to a wakeword, which the voice-enabled devices 108(1) and 108(2) each detect or capture. However, voice-enabled device 108 (N) may not detect the speech utterance. Each of the voice-enabled devices 108(1) and 108(2) produce audio signals 114 representing the speech utterance 106. In some examples, the audio signals 114 may represent other sounds that may trigger a response, such as glass breaking, an appliance beeping, a smoke alarm sounding, a baby crying, etc. Additionally, the voice-enabled devices 108(1) and 108(2) may each determine various audio signal metric values 116(1) and 116(2) (collectively "audio signal metric values 116"), or determine additional metadata associated with the speech utterance 106, and/or the circumstances involving the voice-enabled devices 108(1) and 108(2).

As one example, voice-enabled device 108(1) may be located on a table directly in front of the user 104, voice-enabled device 108(2) is located on a table across the room from the user 104, and voice-enabled device 108(N) is located on a table behind the user 104. In this circumstance, the voice-enabled devices 108(1) and 108(2) each detect the speech utterance 106, but the voice-enabled device 108(N) does not detect the speech utterance 106. Herein, each of the voice-enabled devices 108(1) and 108(2) may initiate communication with the speech processing system 110 to process the speech input by sending the audio signals 114 that are determined at the respective voice-enabled device 108 and audio signal metric values 116 for each of the audio signals 114. Each audio signal metric value 116 may generally indicate a characteristic of an associated audio signal 114, such as a signal-to-noise ratio, a spectral centroid measure, a speech energy level, a spectral flux, a particular percentile frequency, a clarify, a harmonicity, the level of voice presence detected in the audio signal, an amplitude of the audio signal, etc. As illustrated in FIG. 1, each of voice-enabled devices 108(1) and 108(2) may send audio signals 114(1) and 114(2), and audio signal metric values 116(1) and 116(2) to the speech processing system 110.

In some examples, one or more of the voice-enabled devices 108 may further determine and/or generate, and send additional metadata to the speech processing system 110 that may be used to determine which of the devices 108 is to respond to a command in the speech utterance 106. For instance, the types of metadata may include proximity data, such as physical proximity of the user 104 relative to each of the voice-enabled devices 108, and temporal proximity, such as a time when the speech utterance 106 was detected by each of the voice-enabled devices 108. The metadata may also include snapshots which indicate device states of the voice-enabled devices 108. The snapshots may comprise device states which indicate current activities or operations of the voice-enabled devices 108 before, during, and/or after the speech utterance 106 is detected by the voice-enabled devices 108. Device states of the voice-enabled devices 108 may include, for example, conducting a telephone call, outputting an alarm sound, streaming audio (e.g., music, audio books, etc.), conducting a dialogue with user 104, performing online searches, controlling appliances in a house, or any other type of activity for which a voice-enabled device 108 can be configured to perform. The snapshot may generally represent a state of the voice-enabled device 108(2) as having an alarm sound being output due to an alarm going off on the voice-enabled device 108(2). Conversely, the snapshot of the device state for the voice-enabled device 108(1) indicates that the device 108(1) is not in any active state other than streaming the audio signal 114(1).

While the snapshots of the devices states may be sent up to the speech processing system 110 when a speech utterance is detected 106, in other examples, the speech processing system 110 may also store indications of devices states rather than receiving them each time an audio signal 114 is received. For example, the speech processing system 110 may receive an indication that the user 104 set an alarm, and know what time the alarm will sound. Thus, once the alarm is sounding, the speech processing system 110 may already have the devices states stored and does not receive the snapshots every time a speech utterance 106 is detected. Similarly, some or all of the metadata may be stored at the speech processing system 110 prior to the speech utterance 106 being captured by the voice-enabled devices 108(1) and/or 108(2).

In various examples, the audio signals 114 and the audio signal metric values 116 may be sent to the speech processing system 110 over one or more networks 118. The one or more networks 118 may include any viable communication technology, such as wired and/or wireless modalities and/or technologies. Networks 118 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

In some examples, the speech processing system 110 may include one or more processors 120 and computer-readable media 122 storing various components for determining which voice-enabled device 108 is to respond to a command in the speech utterance 106. For example, the computer-readable media 122 may include an orchestration component 124 that calls or communicates with an automatic speech recognition (ASR) component 126, and a natural language understanding (NLU) component 128 for processing one or more of the audio signals 114. For example, the orchestration component 124 may stream the audio signal 114 to the ASR component 126, which detects the speech utterance 106 endpoint and sends a message to the voice-enabled device 106 to close the stream of the audio signal 114. In some instances, the ASR component 126 of the speech processing system 110 may process the one or more audio signals 114 at to determine textual data which corresponds to the speech utterance 106. In some examples, the ASR component 126 may generate ASR confidence scores representing the likelihood that a particular set of words of the textual data matches those spoken in the speech utterance 106. For instance, the ASR component 126 may determine a confidence or likelihood that a particular word which matches the sounds would be included in the sentence at the specified location (e.g., using a language or grammar model). Thus, each potential textual interpretation of the spoken utterance 106 (hypothesis) is associated with an ASR confidence score. The ASR component 126 may then return the textual data to the orchestration component 124. While the audio signal metric values 116 are illustrated as being determined at the voice-enabled devices 108, in other examples, some or all of the audio signal metric values 116 may be determined by components of the speech processing system 110, such as ASR component 126, arbitration component 130, and/or NLU component 128.

In various examples, the textual data corresponding to the speech utterance 106 may be sent from the orchestration component 124 to the NLU component 128 to be analyzed or processed by the NLU component 128 to determine an intent expressed by the user 104 in the speech utterance 106. For example, if the user 104 issued a command to "please turn off the alarm," the NLU component 128 may determine that the user's intent is to have the voice-enabled device 108(2) that is outputting the alarm sound turn off the alarm. Once the intent has been determined by the NLU component 128, the orchestration component 124 may pass the intent to a targeting component 134 to use to determine which of the voice-enabled devices 108 is to respond to the speech utterance 106. In some examples, the ASY component 126 and/or the NLU component 128 may detect various types of sound in the audio signals 114 other than, or in combination with, a speech utterance 106. For instance, rather than a speech utterance 106 being included in the audio signals 114, the ASR component 126 and NLU component 128 may detect sounds such as glass breaking, an appliance beeping, a smoke alarm sounding, a baby crying, and/or other sounds which might map to an intent and/or action for the speech processing system 110 to perform.

In various examples, the computer-readable media 122 further stores an arbitration component 130 which may rank the voice-enabled devices 108 that detected the speech utterance 106 based on the audio signal metric values 116 to create a ranked list of devices 132. The arbitration component may use various audio signal metric values 116 to rank the voice-enabled devices 108, such as a signal-to-noise ratio, a spectral centroid measure, a speech energy level, a spectral flux, a particular percentile frequency, a periodicity, a clarity, a harmonicity, and so on. As an example, the audio signal metric values 116(1) for the voice-enabled device 108(1) may be greater or correspond to the better audio signal 114(1) compared to the audio signal metric values 116(2) for the audio signal 114(2) generated by the voice-enabled device 108(2). This may indicate that the user 104 was facing the voice-enabled device 108(1) when issuing the speech utterance 106, or indicate that the user 104 was closer to the voice-enabled device 108(1) than the voice-enabled device 108(2) when issuing the speech utterance 106. The arbitration component 130 may rank the voice-enabled devices 108 according to the audio signal metric values 116. For instance, if the voice-enabled devices 108(1) is associated with a larger SNR value than the voice-enabled device 108(2), then first voice-enabled device 108(1) may be ranked higher (toward the top of the list) than the voice-enabled device 108(2).

As another example, the arbitration component 130 may rank each voice-enabled device 108 based on multiple audio signal metric values 116 (e.g., different types of audio signal metric values). To illustrate, a voice-enabled device 108 may be ranked according to an SNR value for the voice-enabled device 108 and a spectral centroid measure for the voice-enabled device 108. In some instances, different types of audio signal metric values 116 may be weighted differently. In some instances, the arbitration component 130 may rank voice-enabled devices 108 based on weighted audio signal metric values 116. To illustrate, a voice-enabled device 108 may select an audio signal 114 that is associated with a best audio signal metric value 116 (e.g., maximum/highest audio signal metric value or, in some instances, minimum/lowest audio signal metric value) for audio signals 114 for the voice-enabled device 108. The best audio signal metric value 116 may be weighted by a difference (variance) between the best audio signal metric value 116 (e.g., maximum/highest audio signal metric value 116) and a worst audio signal metric value 116 (e.g., minimum/lowest audio signal metric value) for the audio signals 114 of the voice-enabled device 108. The weighted audio signal metric value 116 may be sent to the service provider 102 to rank multiple voice-enabled devices. Upon determining the ranked list of device 132, the arbitration component may provide or send the ranked list of devices 132 to the targeting component 134.

In various examples, the orchestration component 124 may route the intent determined by the NLU component 128 and route the intent to the targeting component 134. The targeting component 134 may determine which of the voice-enabled devices 108 is to respond or perform an action responsive to the speech utterance 106. The targeting component 134 may use the intent determined by the NLU component 128, device states for each of the voice-enabled devices 108, the ranked list of devices 132, and potentially other data to determine which one of the voice-enabled devices 108 is to perform a response to the speech utterance 108. As described above, the targeting component 134 may iteratively move through the ranked list of devices 132 and determine whether one of the devices 108 is capable of performing a response to the speech utterance using various rules. For example, voice-enabled device 108(1) may be a top ranked device on the ranked list of devices 132, or the source device, and the targeting component 134 analyze the intent expressed in the speech utterance 106, as well as the device state of the voice-enabled device 108(1), to determine whether the device 108(1) is capable of responding to the command in the speech utterance. For example, if the speech utterance 106 is to "please stop," the intent may map to devices states which are capable of "stopping" their device state, such as device states of steaming audio, conducting a phone call, outputting an alarm sound, etc. Using the first rule, if the intent of the speech utterance maps to the device state of the source device, or is "relevant" to the device state of the source device, the targeting component may determine that the source device is capable of performing the response to the command and select the source device as the voice-enabled device that is to respond to the command in the speech utterance ("target device").

If the intent expressed in the speech utterance 106 does not map to the device state of the voice-enabled device 108(1), the targeting component 134 may proceed to the next rule and determine if the voice-enabled device 108(1) is part of a device cluster of devices that has a device state to which the intent maps, or otherwise corresponds. In some examples, the targeting component may analyze the user registry 134 to determine, based on the device indications 138, if the voice-enabled device 108(1) is part of a cluster of devices. If the targeting component 134 determines that the intent of the speech utterance 106 maps to the device state of the cluster of devices, or is "relevant" to the device state of the cluster of devices, the targeting component may determine that the cluster of devices can perform the response to the command and select the cluster of devices as the target device. The user registry 134 may store indications of virtual clusters of devices for different user and/or household accounts.

Alternatively, if the targeting component 134 determines that the voice-enabled device 108(1) is not included in a cluster of devices, or if the cluster of devices in which the voice-enabled device 108(1) is included is not capable of performing the respond to the command in the speech utterance, the targeting component 134 may apply a third rule and determine whether the source device is associated with a secondary device 112 that is capable of performing the response to the command.

If the targeting component 134 determines that the voice-enabled device 108(1) is not associated with a secondary device 112, or if the secondary device 112 with which the voice-enabled device 108(1) is associated is not capable of performing the command, the targeting component 134 may determine that the voice-enabled device 108(1) is not the target device. Upon determining that the source device is not the target device, the targeting component 134 may iteratively use the above described rules to determine whether the other voice-enabled devices 108(2) indicated in the ranked list 132 are the target device. The targeting component 134 may move through the ranked list of devices in order to determine whether any of the voice-enabled devices 108 which detected the speech utterance 106 are the target device.

In some examples, the targeting component 134 may determine that the target device is not included in the ranked list 132 of voice-enabled devices 108 which detected the speech utterance 106. In this case, the targeting component 134 may identify, via the user registry 136, all other voice-enabled devices 108 associated with the user and/or household account that did not detect the speech utterance 106, such as voice-enabled device 108(N). The targeting component 134 may then determine whether the intent expressed in the speech utterance 106 maps to, or is otherwise associated with, any of the remaining voice-enabled devices 108(N). If the intent maps to a device state of the voice-enabled device 108(N), the targeting component 134 may select the voice-enabled device 108(N) as the target device. In one example, the targeting component 134 may determine that the voice-enabled device 108(N) is associated, or is controlling, the secondary device 112. If the intent indicates that the command in the speech utterance 106 is a command to "change the channel," the targeting component 134 may determine that the intent maps to the device state of the secondary device 112, which is a television. For instance, the device indications 138 may indicate that a current device state of the secondary device 112 is that the television is presenting video for a channel, and that the television is capable of performing the command "change the channel." In this case, the targeting component may select the voice-enabled device 108(N) as the target device, and provide an indication of the intent, as well as an indication that the voice-enabled device 108(N) is the target device, to a command processor 140.

The command processor 140 may include one or more domain speechlets which determine and generate a response for the voice-enabled device 108(N) to perform. In some examples, the command processor 140 may route identified intents to the appropriate speechlets. For example, the speechlets may be specialized software, domains, and/or devices for responding based on various intents, such as a music domain (e.g., Amazon Music, Pandora, Spotify, etc.), a video domain (e.g., Amazon Video, HBO, Netflix, Hulu, etc.) household organization domain (e.g., calendars, reminders, timers, alarms, etc.), and other types of domains. For example, an intent may include a command to play music (play music intent), the command processor 140 may route the intent to a music domain speechlet configured to execute a music playing command.

Once the command processor 140 has generated a command, the command processor 140 may provide the command in a response 148 to the voice-enabled device 108(N) to cause the secondary device 112 to change the channel.

The actions described herein are performed with respect to three voice-enabled devices 108 in the environment 102. However, any number of voice-enabled devices 108 may be used and handled in the same manner, where the rules and processes performed are scalable to account for additional voice-enabled devices 108. As described, the voice-enabled devices 108 need not detect the speech utterance at all, but still be selected to perform the response 148. For instance, a remote voice-enabled device 108 may be located in another room from the user 104 and not detect the speech utterance 106. The remote voice-enabled device 108 may be, for example, outputting an alarm sound, or conducting a phone call. While the user 104 is not in the same room as the remote voice-enabled device 108, the user 104 may instruct another of the voice-enabled devices 108 to turn off the alarm, or hang up the phone call. The remote voice-enabled device 108 may still be selected to perform the response 148 despite not detecting the speech utterance 106 and transmitting an audio signal 114.

EXAMPLE VOICE-ENABLED DEVICE

Figure 2:
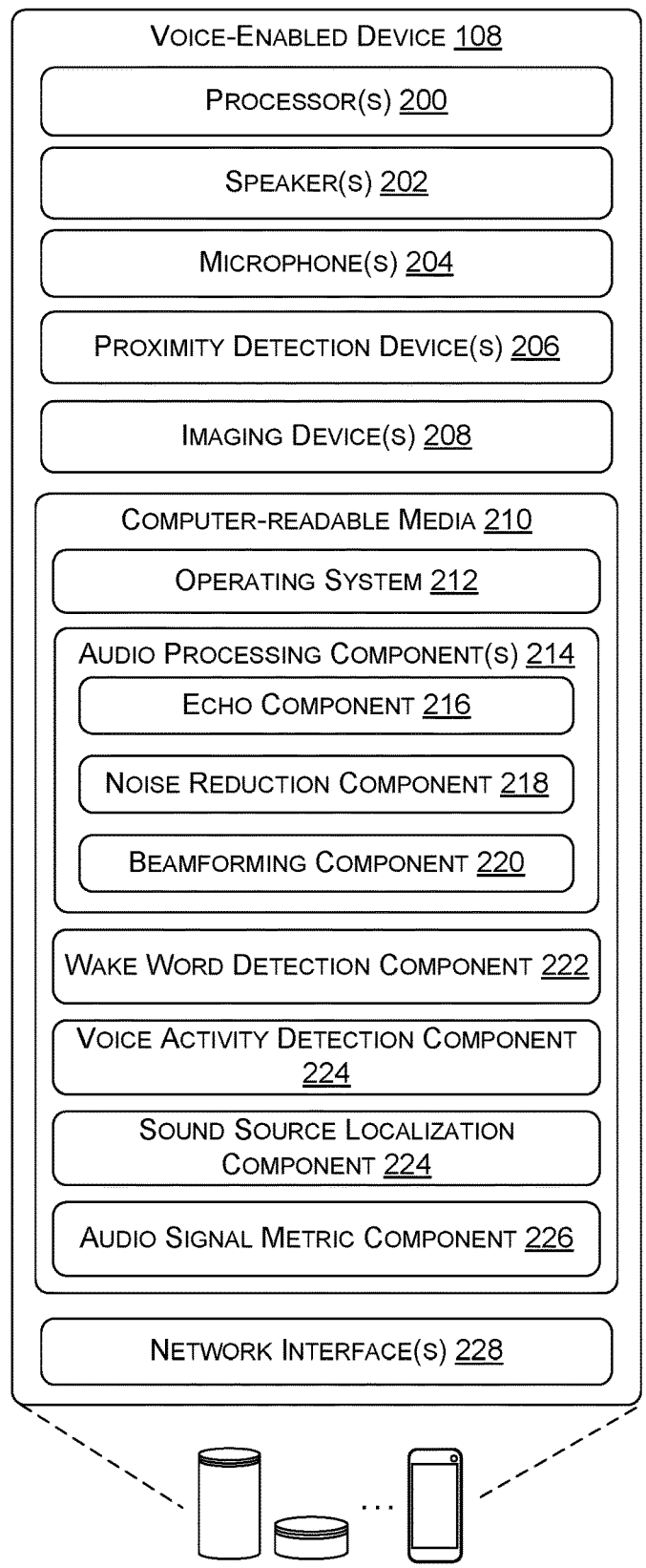
FIG. 2 illustrates a block diagram of an example architecture of a voice-enabled device that generates an audio signal and metadata, and sends the audio signal and metadata to a speech processing system.

FIG. 2 illustrates block diagram of an example architecture of a voice-enabled device, such as one of the voice-enabled devices 108 of FIG. 1, that generates an audio signal and metadata, and sends the audio signal and metadata to a speech processing system. In some examples, the metadata may include various audio signal metric values.

The voice-enabled device includes one or more processors 200, one or more speakers 202, and one or more microphones 204. The processors 200 may include a central processing unit (CPU), a graphics processing unit (GPU), a microprocessor, a digital signal processor, and so on. Although not illustrated, the voice-enabled device 108 may also include one or more input/output devices (e.g., mouse, keyboard, etc.), one or more displays (e.g., touch screen, Liquid-crystal Display (LCD), Light-emitting Diode (LED) display, organic LED display, plasma display, electronic paper display, etc.), one or more sensors (e.g., accelerometer, magnetometer, etc.), one or more lights, and so on. Any number of components of the voice-enabled device 108 may be used to receive input from a user and/or to output a response.

Although the voice-enabled device 108 is illustrated as having one or more integral speakers 202, in other embodiments the voice-enabled device 108 may not include speakers 202. For example, the voice-enabled device 108 may comprise a microphone device into which a user speaks to issue commands or may comprise a device for connection to another appliance such as a television. Instead of integrated speakers 202, embodiments such as this may use loudspeaker capabilities of other devices, including other voice-enabled devices that do have loudspeakers and different types of dedicated loudspeaker components. As one example, the voice-enabled device 108 may produce an audio output signal that drives an external loudspeaker. As another example, the voice-enabled device 108 may drive or control an external loudspeaker through a wireless data connection such as a Bluetooth connection. In other situations, the voice-enabled device 108 may be used in conjunction with a loudspeaker device that receives audio signals and other instructions from the speech processing system 110, rather than from the voice-enabled device 108.

In this case, the response 148 of FIG. 1 may be provided to such as loudspeaker device rather than to the voice-enabled device 108.

The microphones 204 may include sensors (e.g., transducers) configured to receive sound. The microphones 204 may generate input signals for audio input (e.g., sound). For example, the microphones 204 may determine digital input signals for an utterance of a user. In some instances, the microphones 204 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 270) to receive sound from four directions. The microphones 204 may be in a planar configuration, or positioned apart in a non-planar three-dimensional region. In some implementations, the microphones 204 may include a spatially disparate array of sensors in data communication. For example, a networked array of sensors may be included. The microphones 204 may include omnidirectional microphones, directional microphones (e.g., shotgun microphones), and so on.

In some examples, the microphones 204 and the speakers 202 facilitate interactions, such as dialogue, with user 104. The microphones 204 produce audio signals representing sound from the environment of the voice-enabled device 108, such speech utterances 106 by the user 104. The audio signals produced by the microphones 204 may comprise directional audio signals or may be used to produce directional audio signals, where each of the directional audio signals emphasizes audio from a different radial direction relative to the microphones 204.

The processors 200 of the voice-enabled device 108 may be coupled to the components of the voice-enabled device 108 to cause the voice-enabled device 108 to perform various actions or operations. In some examples, the voice-enabled device 108 may include one or more proximity detection devices 206, such as a camera, a ranging device, or other sensor that is used to determine the portion of the user 104 relative to the voice-enabled device 108, and generate corresponding proximity or distance data. This proximity or distance data may be used as metadata for purposes of arbitration.

The voice-enabled device 108 may also include imaging devices 208 which take images of the environment 102 of the user 104. For instance, upon detecting a wakeword or other wake event, the voice-enabled device 108 may collect image data using the imaging devices 208. The imaging devices may include a camera, thermal imaging device, or any other type of imaging device 208 to capture images of the environment 102. The imaging devices 208 may generate image data, which in turn may be used as metadata for purposes of arbitration.

The voice-enabled device 108 may include computer-readable media 210. The computer-readable media 210 may be used to store any number of software components that are executable by the processors 200. Software components stored in the computer-readable media 210 may include an operating system 212 that is configured to manage hardware and services within and coupled to the voice-enabled device 108. In addition, executable components stored by the computer-readable media 210 may include audio processing components 214 configured to produce an audio signal using the microphones 204. The audio processing components 214 may include functionality for processing microphone audio signals generated by the microphones 204 and/or output audio signals provided to the speakers 202. As an example, the audio processing components 214 may include an acoustic echo cancellation or suppression component 216 for reducing acoustic echo generated by acoustic coupling between the microphones 204 and the speaker 202. The audio processing components 214 may also include a noise reduction component 218 for reducing noise in received audio signals, such as elements of microphone audio signals other than user speech.

The audio processing components 214 may include one or more audio beamformers or beamforming components 220 configured to generate directional audio signals that are focused in different directions. More specifically, the beamforming components 220 may be responsive to audio signals from spatially separated microphone elements of the microphones 204 to produce directional audio signals that emphasize sounds originating from different areas of the environment of the voice-enabled device 108 or from different directions relative to the voice-enabled device 108. The beamforming components 220 may in some cases produce audio signal metric values that may be used in arbitration. For example, the beamforming components 220 may indicate a signal strength of voice activity level corresponding to each directional audio signal.

Executable components stored in the computer-readable media 210 and executed by the processors 200 may include a wake word detection component 222 that monitors one or more of the directional audio signals to detect user utterances of the system of the trigger expression. As described above, wakeword detection may be implemented using keyword spotting technology, as an example.

The software components may also include a voice activity detection component 224 configured to monitor levels of voice presence in the directional audio signals produced by the beamforming component 220. Levels of voice presence may be used as am audio signal metric value for purposes of arbitration. In some examples, the voice activity may include an indication of the signal strength of the speech utterance 106 and an indication of ambient noise in the environment 102. For instance, the voice activity may be a ratio of the signal strength of the speech utterance 106 in an audio signal 114 with the ambient noise in the audio signal 114.

Software components of the voice-enabled device 108 may also include a sound source localization (SSL) component 224 that may be used to determine the distance of the user 104 from the voice-enabled device 108. The SSL component 224 is configured to analyze differences in arrival times of received sound at the respective microphones of the microphones 204 in order to determine the position from which the received sound originated. For example, the SSL component 224 may use time-difference-of-arrival (TDOA) techniques to determine the position or direction of a sound source. The determined position may be used as an audio signal metric value for purpose of performing arbitration as described herein.

The voice-enabled device 108 also has various hardware components, not shown, such as communication components, power components, I/O components, signal processing components indicators, control buttons, amplifiers, etc. For instance, rather than receiving a "wake-word" to wake up, a voice-enabled device 108 instead begin listening in response to a user 104 pressing a button on the device 108.

The voice-enabled device 102 may have one or more network interfaces 228 such as a wireless or Wi-Fi network communications interface, an Ethernet communications interface, a cellular network communications interface, a Bluetooth communications interface, etc., for communications with the speech processing system 110 over various types of networks 118, including wide-area network, local-area networks, private networks, public networks etc. In the case of a wireless communications interfaces, such interfaces may include radio transceivers and associated control circuits and logic for implementing appropriate communication protocols.

In some examples, the audio signal metric component 226 may determine an audio signal metric value for each of a plurality of audio signals 114 (e.g., beamformed audio signals) provided by the beamformer component 220. In some embodiments, each audio signal metric value is determined based on the samples of one of a plurality of frames of a beamformed audio signal. For example, a signal-to-noise ratio may be determined for a plurality of frames for each of the plurality of beamformed audio signals.

The audio signal metric values f may be determined for each of the plurality of beamformed audio signals for each frame, resulting in an array of numbers in the form f(n)(k):
{f(1)(k), f(2)(k), . . . , f(N)(k)}

Here, "k" is the time index and "n" is the audio stream index (or look direction index) corresponding to the nth beamformed audio signal.

An audio signal metric value may include a signal-to-noise ratio (SNR), a level of voice presence in the audio signals 114, a spectral centroid measure (e.g., a peak spectral centroid measure), a speech energy level (e.g., a 4 Hz modulation energy), a spectral flux, a particular percentile frequency (e.g., a 90$^{th}$ percentile frequency), a periodicity, a clarity, a harmonicity, and so on. A spectral centroid measure generally provides a measure for a centroid mass of a spectrum. A spectral flux generally provides a measure for a rate of spectral change. A particular percentile frequency generally provides a measure based on a minimum frequency bin that covers at least a particular percentage (e.g., 90%) of the total power. A periodicity generally provides a measure that may be used for pitch detection in noisy environments. Clarity generally provides a measure that has a high value for voiced segments and a low value for background noise. Harmonicity is another measure that generally provides a high value for voiced segments and a low value for background noise. A speech energy level (e.g., 4 Hz modulation energy) generally provides a measure that has a high value for speech due to a speaking rate. In other embodiments, any another audio signal metric value may be determined that is some function of raw beamformed signal data over a brief time window (e.g., typically not more than one frame). In some instances, an audio signal metric value may be determined based on samples of a plurality of frames of a beamformed audio signal. Further, in some instances an audio signal metric value may be referred to as a signal feature.

In some implementations, an audio signal metric value may be defined according to the following table:

| Feature Name | Formula | Description |
|---|---|---|
| Spectral Centroid | $\sum_{k=0}^{k=nBins-1} \frac{k \cdot |X_t^k|}{\sum_{j=0}^{j=nBins-1} |X_t^j|}$<br>X is the FFT magnitude spectrum of spectrum of the 't'th frame. | Weighted average of the frequency spectrum. The weights are the power in the 'kth' frequency bin. This feature indicates if an acoustic source has energies predominantly in the high frequency. |
| Spectral Flux | $\sum_{k=0}^{k=nBins-1} |||X_t^k|-|X_{t-1}^k|||_1$ | Rate of change in spectral energies per unit time (frame). Indicates if the audio contains transients and changes rapidly. |
| 90$^{th}$ Percentile Frequency | $\left. \frac{\sum_{n=0}^{N} |X_t^n|^2}{\sum_{k=0}^{k=nBins-1} |X_t^k|^2} \right|_N \geq 0.9$ | Frequency at which the cumulative energy of the frame contains more P percent of the total energy. Similar to the centroid, this feature characterizes the frequency distribution of the acoustic signal. |
| Periodicity | $\underset{125\,Hz \leq \omega \leq 500.0\,Hz}{\mathrm{argmax}} [P(t, \omega)] \Big|_{P(t,\omega)=\sum_{l=1}^{R} \log|X(t, l\omega)|}$ | A measure correlated with the fundamental frequency of the acoustic signal in noisy conditions. Calculated over 'R' frames. |

-continued

| Feature Name | Formula | Description |
|---|---|---|
| Clarity | $\dfrac{D(t, k_{min})}{D(t, k_{max})} \Big|_{k_{max} = \underset{2 \le k \le 8\,ms}{\mathrm{argmax}} D(t, k)}$  $D(t, k_{min})$, $D(t, k_{max})$ are min and max deviation from the zero-lag autocorrelation function | A measure that characterizes the tonal content of an audio signal. This ratio is high for harmonic signals (e.g., voiced speech), but low for noisy signals. |
| Harmonicity | $h(t) = \dfrac{r_{xx}(t, k_{max})}{r_{xx}(t, 0) - r_{xx}(t, k_{max})} \Big|_{k_{max} = \underset{2\,ms < k < 8\,ms}{\mathrm{argmax}}\, r_{xx}(t, k)}$ | Similar to clarity; high value for voiced segments and low for background noise. |

In some instances, the audio signal metric component 228 may determine an audio signal metric value with respect to a particular beamformed audio signal. As one example, an SNR value may be determined for a beamformed audio signal that is associated with a particular look direction. In other instances, an audio signal metric value may be determined for multiple beamformed audio signals. As one example, an average audio signal metric value may be determined for a plurality of beamformed audio signals that are determined for a voice-enabled device, such as an average SNR value across any number of beamformed audio signals for the voice-enabled device.

While various processing techniques and audio signal metric values are discussed herein, any other type of audio signal metric value may be determined using the components of the voice-enabled device 108.

Figure 3:
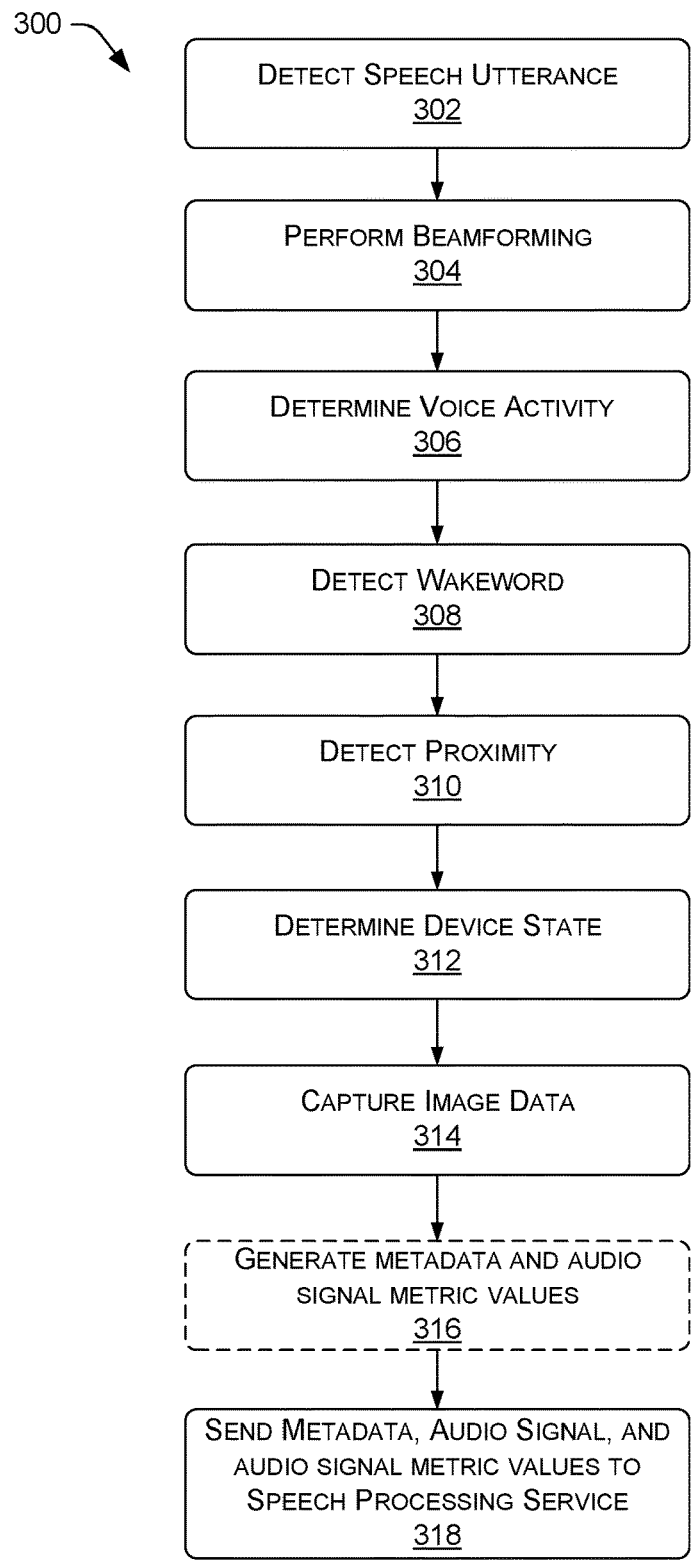
FIG. 3 illustrates a flow diagram of an example method for providing, by a voice-enabled device, an audio signal, and metadata to a speech processing system.

FIG. 3 illustrates a flow diagram of an example method 300 for providing, by a voice-enabled device 108, an audio signal 114 and audio signal metric values 116 to a speech processing system 110. At 302, the voice-enabled device 108 may detect sound including a speech utterance, such as speech utterance 106, using the microphones 204. The order in which the operations or steps of method 300 are described is not intended to be construed as a limitation, and any number of the described operations may be combined in any order and/or in parallel to implement method 300. For instance, the step of perform beamforming 304 be continuously performed while the speech utterance is detected and captured at 302. Further, the other steps may be performed in any order.

At 304, the voice-enabled device may perform beamforming using the beamforming component 220. The beamforming may comprise audio beamforming to produce multiple directional audio signals, where each directional audio signal emphasizes sound coming from a different direction relative to the voice-enabled device 108. The voice-enabled device 108 may perform beamforming 304 using time-difference-of-arrival (TDOA) techniques, such using pairs of microphones 204 and delaying the signal from one of the microphones 204 by an amount that is equal to the time for sound to travel the distance between the microphones 204, thereby emphasizing sound sources that are aligned with the two microphones. Different pairs of microphones 204 can be used in this manner to obtain multiple audio signals, each of which correspond to a different direction.

At 306, the voice-enabled device may determine voice activity using voice activity detection (VAD) to detect the presence of voice in the directional audio signals. Upon detecting voice presence in one of the directional audio signals, subsequent actions are performed with respect to that directional audio signal. In some embodiments, the subsequent actions of FIG. 3 are performed with respect to the directional audio signal having the highest voice presence. In some examples, the voice activity may include an indication of the signal strength of the speech utterance 106 and an indication of ambient noise in the environment 102. For instance, the voice activity may be a ratio of the signal strength of the speech utterance 106 in an audio signal 114 with the ambient noise in the audio signal 114.

VAD determines the level of voice presence in an audio signal by analyzing a portion of the audio signal to evaluate features of the audio signal such as signal energy and frequency distribution. The features are quantified and compared to reference features corresponding to reference signals that are known to contain human speech. The comparison produces a score corresponding to the degree of similarity between the features of the audio signal and the reference features. The score is used as an indication of the detected or likely level of speech presence in the audio signal.

At 308, the voice-enabled device 108 may detect a wakeword by performing wakeword detection on the directional audio signal within which voice activity has been detected or on the directional audio signal within which the highest level of voice activity has been detected. As mentioned above, a predefined word, expression, or other sound can be used as a signal that the user intends subsequent speech to be received and acted upon by the voice-enabled device 108.

In the described embodiment, the wakeword detection may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In some cases, a keyword spotter may use simplified ASR (automatic speech recognition) techniques. For example, wakeword detection may use a Hidden Markov Model (HMM) recognizer that performs acoustic modeling of an audio signals and compares the HMM model to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models.

The wakeword detection may also use a support vector machine (SVM) classifier that receives the one or more feature scores produced by the HMM recognizer. The SVM classifier produces a confidence score indicating the likelihood that an audio signal contains the trigger expression.

At 310, the voice-enabled device 108 may detect proximity or distance of a user 104 to the voice-enabled device 108 using proximity detection. Proximity detection may be implemented using sound source localization (SSL) techniques in conjunction with a two-dimensional microphone array, as an example. Such SSL techniques analyze differences in arrival times of received sound at the respective microphones of microphone in order to determine the position from which the received sound originated. Alternatively, the voice-enabled device 108 may have cameras or specialized sensors for determining the position of a user 104 relative to the voice-enabled device 108.

At 312, the device state determination component 226 may determine a device state of the voice-enabled device 108. The device state, or snapshot, may be used as metadata for arbitration and/or targeting.

At 314, the imaging devices 208 may be used to capture image data of the environment 102 of the user 104. In some instances, the imaging devices 208 may be configured to capture image data in a direction from which the sound came from the user 104.

Any of the actions of the method 300 may produce items of the metadata 116. For example, the VAD 306 may produce a voice presence level, indicating the likelihood a person is speaking in the vicinity of the voice-enabled device 108. The VAD 306 may also produce a signal-to-noise measurement. The wakeword may produce a wakeword confidence level, corresponding to the likelihood that the user 104 has uttered the wakeword. The wakeword detection 308 may also produce a timestamp indicating the time at which the wakeword was detected. The proximity detection 310 may produce a distance parameter, indicating distance of the user 104 from the voice-enabled device 108.

At 316, the voice-enabled device 108 may perform various types of processing on the audio signal 114 to generate metadata and/or audio signal metric values. As discussed above, the processing may result in various types of audio signal metric values, such as a signal-to-noise ratio, a spectral centroid measure, a speech energy level (e.g., a 4 Hz modulation energy), a spectral flux, a particular percentile frequency (e.g., $90^{th}$ percentile frequency), a periodicity, a clarity, a harmonicity, and so on.

At 318, the voice-enabled device 108 may send, via the network interfaces 228, the audio signal 114 and the audio signal metric values 116 to the speech processing system 110. The audio signal 114 may comprise one of the directional audio signals, such as the directional audio signal in which speech was detected and in which the wakeword was detected.

In some examples, the metadata and/or audio signal metric values 116 sent to the speech processing system 110 may include information generated based on the sensor data, or the sensor data itself. For instance, the components of the voice-enabled device 108 may perform processing at 316 on sensor data collected by the various sensors (e.g., proximity detection device(s) 206, imaging device(s) 208, etc.) to generate metadata. For example, the audio processing components(s) 214 may perform various processing on audio signals generated by the microphones 204, such as noise reduction or beamforming. In other examples, the audio signal metric values 116 may simply include sensor data collected by the sensors without any processing performed thereon. Thus, in some examples, all or some of the processing and/or generating performed at 316 may be optional, and the voice-enabled device 108 may simply relay all data collected by the various sensors directly to the speech processing system.

EXAMPLE SPEECH PROCESSING SYSTEM

Figure 4A:
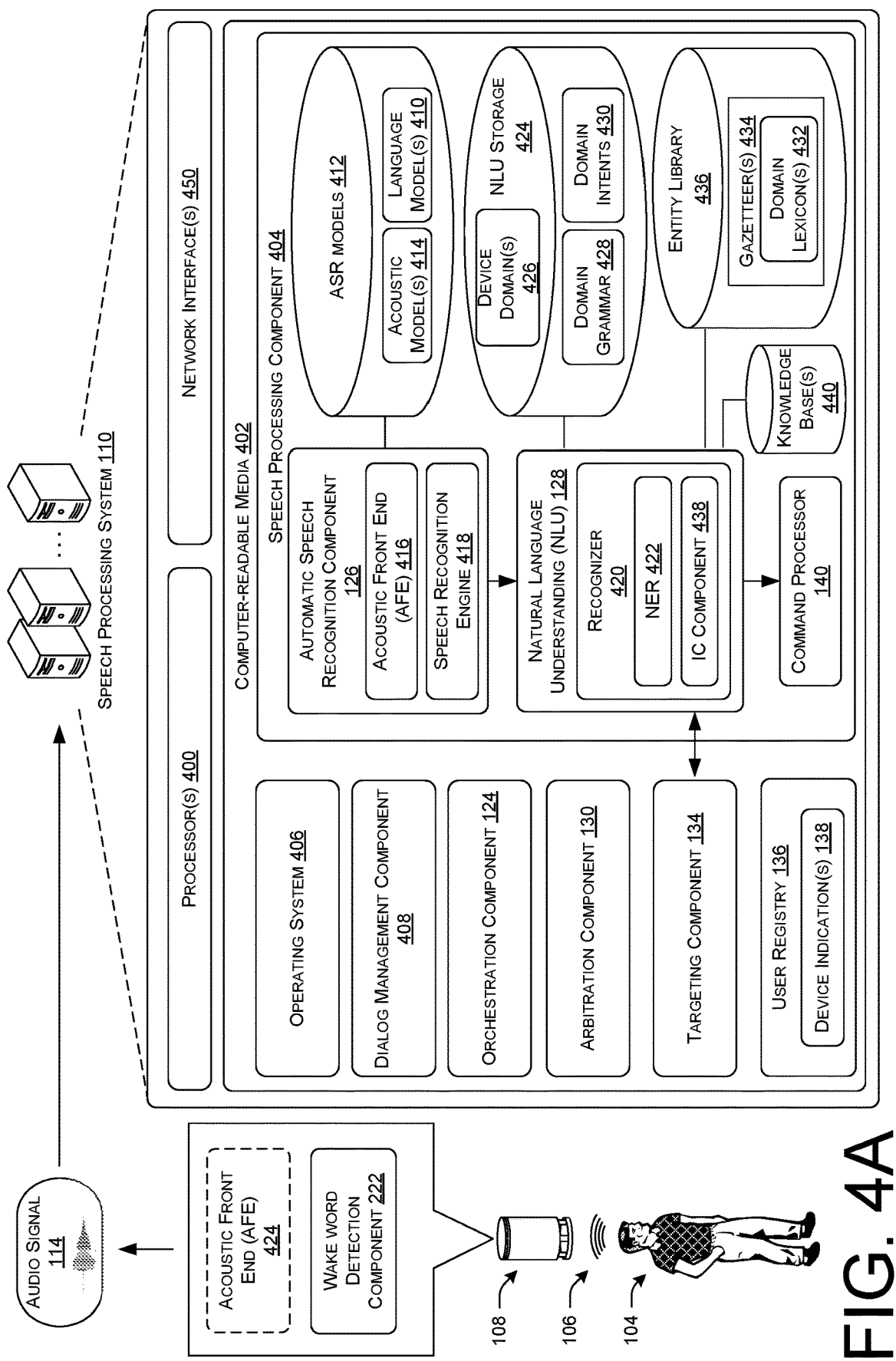
FIG. 4A illustrates a block diagram of an example architecture of a speech processing system which receives audio signals and audio signal metric values from voice-enabled devices, and performs arbitration to determine which of the voice-enabled devices is to respond to a speech utterance of a user represented in the audio signal.

FIG. 4A illustrates a block diagram of an example architecture of a speech processing system 110 which receives audio signals 114 and audio signal metric values 116 from voice-enabled devices 108, and performs processing techniques to determine which of the voice-enabled devices 108 is to respond to a speech utterance 106 of a user 104 represented in the audio signal 114.

FIG. 4A includes a conceptual diagram of how a speech utterance 106 can be processed, allowing a system to capture and execute commands spoken by a user 104, such as spoken commands that may follow a wakeword. The various components illustrated may be located on a same or different physical devices. Communication between various components illustrated in FIG. 4A may occur directly or across a network 118. An audio capture component, such as a microphone 204 of voice-enabled device 108, captures audio corresponding to a speech utterance 106. The voice-enabled device 108, using a wakeword detection component 222, then processes the speech utterance 106, or audio data corresponding to the speech utterance 106, to determine if a keyword (such as a wakeword) is detected in the speech utterance 106. Following detection of a wakeword, the voice-enabled device 108 sends an audio signal 114 corresponding to the speech utterance 106, to a computing device of the speech processing system 110 that includes the ASR component 126. The audio signal 114 may be output from an acoustic front end (AFE) 424 located on the voice-enabled device 108 prior to transmission. Or, the audio signal 114 may be in a different form for processing by a remote AFE 416, such as the AFE 416 located with the ASR component 126.

In various examples, the speech processing system 110 may include one or more processors 400 to power components, devices, and actions of the speech processing system 110, and one or more network interfaces 450 such as a wireless or Wi-Fi network communications interface, an Ethernet communications interface, a cellular network communications interface, a Bluetooth communications interface, etc., for communications by the speech processing system 110 over various types of networks 118, including wide-area network, local-area networks, private networks, public networks etc. In the case of a wireless communications interfaces, such interfaces may include radio transceivers and associated control circuits and logic for implementing appropriate communication protocols.

The speech processing system 110 may further include computer-readable media 402 which stores various components, components, or other executable software to perform various arbitration actions to determine which voice-enabled device is to respond to a command in the speech utterance 106. The computer-readable media may store an operating system 406 that is configured to manage hardware and services within and coupled to the speech processing system 110.

The computer-readable media 402 may further store a dialog management component 408 that is responsible for conducting speech dialogs with the user 104 in response to meanings or intents of user speech determined by the NLU component 128. The dialog management component 408 may include domain logic that is used to analyze the meaning of user speech and to determine how to respond to the user speech. The dialog management component 408 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

The computer-readable media 402 may further include the arbitration component 130, the targeting component 134, and the user registry 136 including the device indications 138. The arbitration component 130 may perform various functions or processes for determining a ranked list of devices 132 based on audio signal metric values 116 for voice-enabled devices 108 that generated audio signals 114 corresponding to a speech utterance 106. The targeting component 134 may perform various operations for determining which voice-enabled devices 108 are to respond to a command in the speech utterance 106. For instance, the targeting component 134 may determine, using the user registry 136, all of the voice-enabled devices 108 and/or secondary devices 112 associated with a user and/or household account. The targeting component 134 may use the ranked list of devices 132, intent expressed in the speech utterance 106 determined by the NLU component 128, and the devices states stored in the device indications 138 to determine which of the devices 108 should perform the command indicated in the speech utterance 106.

The speech processing system 110 may further include various components for processing a speech utterance 106, such as automatic speech recognition component 126 and natural language understanding component 128. The various components illustrated may be located on a same or different physical devices.

In some examples, audio data (e.g., audio signals 114) may be received by the speech processing system 110 for speech processing for interpretation of the included speech utterance 106 (either for purposes of enabling voice-communications and/or for purposes of executing a command in the speech). The audio data may include data corresponding to the wakeword, or the portion of the audio data corresponding to the wakeword may be removed by the voice-enabled device 108 prior to sending. Upon receipt by the speech processing system 110, the ASR component 126 may convert the audio data into text. The ASR component 126 transcribes audio data into text data representing the words of the speech contained in the audio data. The text data may then be used by other components for various purposes, such as arbitration, executing system commands, inputting data, etc. A speech utterance 106 in the audio data is input to a processor configured to perform ASR which then interprets the utterance based on the similarity between the utterance and pre-established ASR language models stored in an ASR model knowledge base (ASR Models Storage 412). For example, the ASR process may compare the input audio data with models for sounds (e.g., subword units or phonemes) and sequences of sounds to identify words that match the sequence of sounds spoken in the utterance of the audio data.

The different ways a speech utterance 106 may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 414 stored in an ASR Models Storage 412), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 126 outputs the most likely text recognized in the audio data. The ASR component 126 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 416 and a speech recognition engine 418. The acoustic front end (AFE) 416 transforms the audio data from the microphone into data for processing by the speech recognition engine 418. The speech recognition engine 418 compares the speech recognition data with acoustic models 414, language models 410, and other data models and information for recognizing the speech conveyed in the audio data. The AFE 416 may reduce noise in the audio data and divide the digitized audio data into frames representing time intervals for which the AFE 416 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 416 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 418 may process the output from the AFE 416 with reference to information stored in speech/model storage (412). Alternatively, post front-end processed data (such as feature vectors) may be received by the device executing ASR processing from another source besides the internal AFE 416. For example, the voice-enabled device 108 may process audio data into feature vectors (for example using an on-device AFE 416) and transmit that information to a server across a network for ASR processing. Feature vectors may arrive at the speech processing system 110 encoded, in which case they may be decoded prior to processing by the processor executing the speech recognition engine 418.

The speech recognition engine 418 attempts to match received feature vectors to language phonemes and words as known in the stored acoustic models 414 and language models 410. The speech recognition engine 418 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 418 may use a number of techniques to match feature vectors to phonemes, for example using Hidden Markov Models (HMMs) to determine probabilities that feature vectors may match phonemes. Sounds received may be represented as paths between states of the MINI and multiple paths may represent multiple possible text matches for the same sound.

Following ASR processing, the ASR results may be sent by the speech recognition engine 418 to other processing components, which may be local to the device performing ASR and/or distributed across the network(s). For example, ASR results in the form of a single textual representation of the speech, an N-best list including multiple hypotheses and respective scores, lattice, etc. may be sent to the speech processing system 110, for natural language understanding (NLU) processing, such as conversion of the text into commands for execution, either by the user device, by the speech processing system 110, or by another device (such as a server running a specific application like a search engine, etc.).

The NLU component 128 (e.g., server) may include various components, including potentially dedicated processor(s), memory, storage, etc. As shown in FIG. 4A, the NLU component 128 may include a recognizer 420 that includes a named entity recognition (NER) component 422 which is used to identify portions of query text that correspond to a named entity that may be recognizable by the system. A downstream process called named entity resolution links a text portion to a specific entity known to the system. To perform named entity resolution, the system may utilize gazetteer information 434 stored in entity library storage 436. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 128 takes textual input (such as the textual input determined by the ASR component 126) and attempts to make a semantic interpretation of the text. That is, the NLU component 128 determines the meaning behind the text based on the individual words and then implements that meaning. NLU component 128 interprets a text string to derive an intent or a desired action from the user as well as the pertinent pieces of information in the text that allow a device (e.g., voice-enabled device 108) to complete that action. For example, if a spoken utterance is processed using ASR component 126 and outputs the text "turn off the alarm" the NLU component 128 may determine that the user 104 intended that the voice-enabled device 108(2) be instructed to turn off an alarm sound being output. As another example, if the spoken utterance is processed using ASR component 126 and outputs the text "hang up the phone" the NLU component 128 may determine that the user 104 intended that the voice-enabled device 108(2) be instructed to hang up a phone through which a phone call is being performed.

The NLU component 128 may process several textual inputs related to the same utterance. For example, if the ASR component 126 outputs N text segments (as part of an N-best list), the NLU component 128 may process all N outputs to obtain NLU results.

To correctly perform NLU processing of speech input, the NLU component 128 may be configured to determine a "domain" of the utterance so as to determine and narrow down which services offered by the endpoint device (e.g., speech processing system 110 or the voice-enabled device 108) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 422 receives a query in the form of ASR results and attempts to identify relevant grammars and lexical information that may be used to construe meaning. To do so, the NLU component 128 may begin by identifying potential domains that may relate to the received query. The NLU storage 424 includes a database of devices domains 426 which identify domains associated with specific devices. For example, the voice-enabled device 108 may be associated with domains for music, telephony, calendaring, contact lists, and device-specific communications, but not video. In addition, the device domains 426 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 420, language model and/or grammar databases 428, a particular set of domain intents/actions 430, and a particular personalized domain lexicon 432. Each gazetteer 434 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 438 parses the query to determine an intent or intents for each identified domain, where the intent corresponds to the action to be performed that is responsive to the query. Each domain is associated with a database (e.g., domain intents 430) of words linked to intents. For example, a music domain intent database 430 may link words and phrases such as "quiet," "volume off," and "mute" to a "mute" intent. A voice-message domain intent database, meanwhile, may link words and phrases such as "send a message," "send a voice message," "send the following," or the like. The IC component 438 identifies potential intents for each identified domain by comparing words in the query to the words and phrases in the domain intents database 430. In some instances, the determination of an intent by the IC component 438 is performed using a set of rules or templates that are processed against the incoming text to identify a matching intent.

In order to generate a particular interpreted response, the NER 422 applies the grammar models and lexical information associated with the respective domain to actually recognize a mention one or more entities in the text of the query. In this manner, the NER component 422 identifies "slots" (i.e., particular words in query text) that may be needed for later command processing. Depending on the complexity of the NER component 422, it may also label each slot with a type of varying levels of specificity (such as noun, place, city, artist name, song name, or the like). Each grammar model 428 includes the names of entities (i.e., nouns) commonly found in speech about the particular domain (i.e., generic terms), whereas the lexical information 432 from the gazetteer 434 is personalized to the user(s) and/or the device. For instance, a grammar model associated with the shopping domain may include a database of words commonly used when people discuss shopping.

The intents identified by the IC component 438 are linked to domain-specific grammar frameworks (included in 430) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (428) framework or frameworks may correspond to sentence structures such as "Send a message to {contact}," "Send a voice message to {contact}," "Send the following to {contact}," etc.

For example, the NER component 422 may parse the query to identify words as subject, object, verb, preposition, etc., based on grammar rules and/or models, prior to recognizing named entities. The identified verb may be used by the IC component 438 to identify intent, which is then used by the NER component 422 to identify frameworks. A framework for the intent of "send a message," meanwhile, may specify a list of slots/fields applicable to play the identified "contact" and any object modifier (e.g., specifying a device of the recipient) or the like. The NER component 422 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 422 may search the database of generic words associated with the domain (in the knowledge base 440). So, for instance, if the query was "send message to Joe," after failing to determine a last name for "Joe," the NER component 422 may search the domain vocabulary for the word "Joe." In the alternative, generic words may be checked before the gazetteer information, or both may be tried, potentially producing two different results.

The output data from the NLU component 128 (which may include tagged text, commands, etc.) may then be sent to the command processor 140. The destination command processor 140 may be determined based on the NLU output. For example, if the NLU output includes a command to send a message, the destination command processor 140 may be a message sending application, such as one located on the user device or in a message sending appliance, configured to execute a message sending command. If the NLU output includes a search request, the destination command processor 140 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 128 during runtime operations where NLU operations are performed on text (such as text output from an ASR component 1003). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 420. Each recognizer may include various NLU components such as an NER component 422, IC component 438 and other components such as an entity resolver, or other components.

As noted above, multiple devices may be employed in a single speech processing system 110. In such a multi-device system, each of the devices may include different components for performing different aspects of the speech processing. The multiple devices may include overlapping components. The components of the voice-enabled device 108 and the speech processing system 110, as illustrated herein are exemplary, and may be located in a stand-alone device or may be included, in whole or in part, as a component of a larger device or system, may be distributed across a network or multiple devices connected by a network, etc.

Figure 4B:
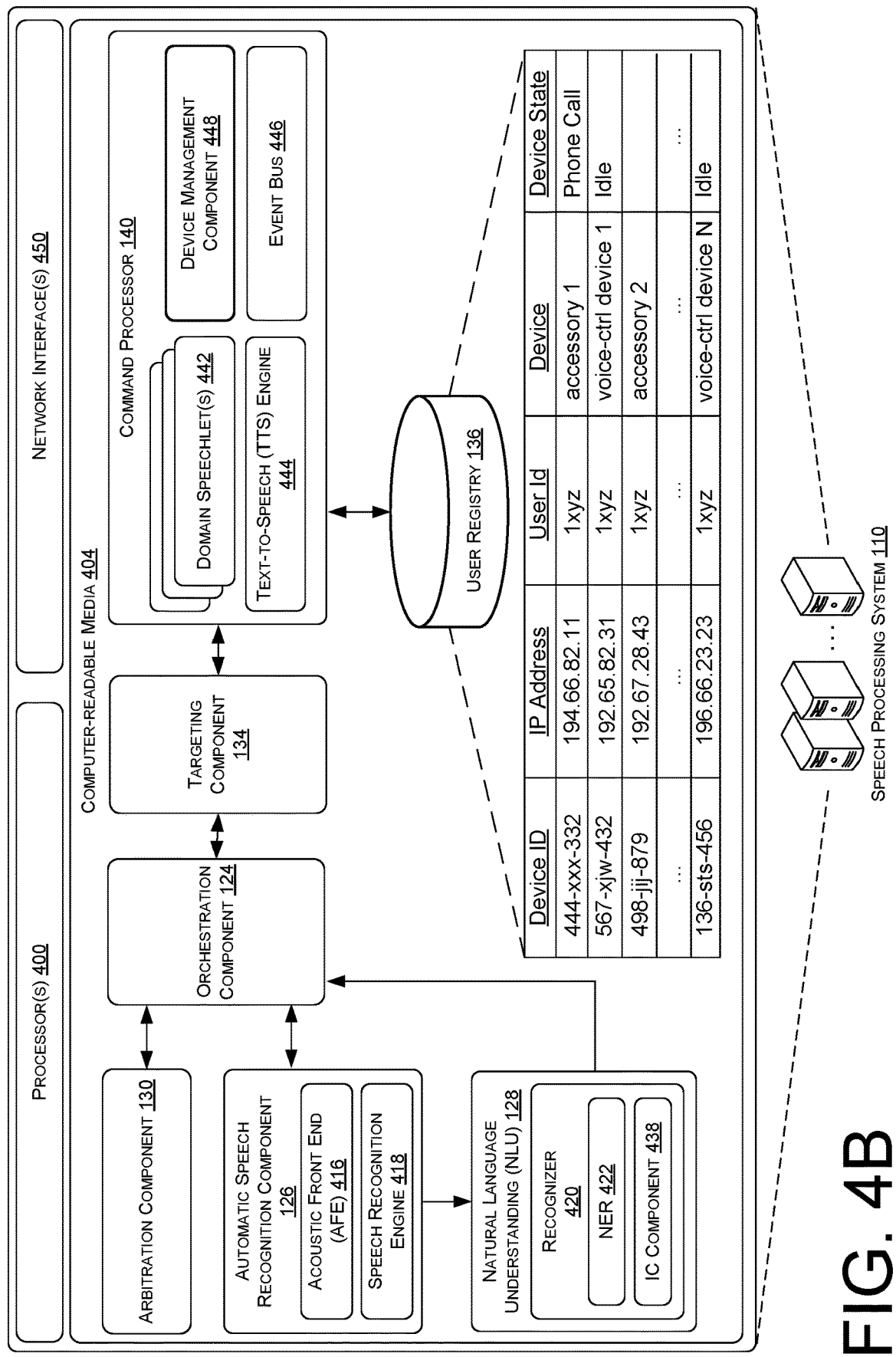
FIG. 4B illustrates a block diagram of an example architecture of a speech processing system including a command processor configured to make a decision as to which voice-enabled device is to respond to a speech utterance of a user.

FIG. 4B illustrates a block diagram of an example architecture of the speech processing system 110 including the command processor 140 configured to generate a command that the selected voice-enabled device 108 uses to respond to the speech utterance 106. As illustrated in FIG. 4B, the speech system 110, including the orchestration component 124 and a speech processing component 404 comprising the ASR component 126 and the NLU component 128, may be coupled to the targeting component 134 and provide the targeting component with the intent determined to be expressed in the speech utterance 106. Further, the arbitration component 130 may provide the ranked list of devices 132 to the targeting component 134, as well as device indicators (e.g., IP addresses, devices names, etc.) for one or more of the voice-enabled devices 108 in the ranked list of devices 132. The targeting component 134 may then perform techniques to determine a target device (e.g., a device to perform the requested operation), and provide various data to the command processor 140. For instance, the targeting component 134 may provide the command processor 140 with various device identifiers of the voice-enabled devices 108, the determined target device, the determined intent and/or command, etc.

The command processor 140 and/or NLU component 128 may determine a domain based on the intent and, based on this determination, route the request corresponding to the audio data to the appropriate domain speechlet, such as the illustrated domain speechlets 442. The domain speechlet 442 may comprise any type of device or group of devices (e.g., hardware device, virtual devices or partitions, server, etc.), and may receive the text data and/or an intent associated with the audio signals 114 and determines how to respond to the request. For instance, the intent for a command "please hang up my phone call" may be routed to a smart home domain speechlet 442 which controls devices connected to the voice-enabled devices 108, such as a phone through which a phone call is being conducted. The smart home domain speechlet 442 may determine a command to generate based on the intent of the user 104 to hang up a phone call. Additionally, the smart home domain speechlet 442 may determine additional content, such as audio data, to be output by one of the voice-enabled devices 108(1) or 108(2), such as "we have hung up your phone call."

Various types of domain speechlets 442 may be used to determine which devices 108 to use to respond to a speech utterance 106, as well as the appropriate response 148 and potential additional content (e.g., audio data). For example, the domain speechlets 442 may include a third party skills domain speechlet 442 which may handle intents associated with gaming, productivity, etc., a music domain speechlet 442 which may handle intents associated with music play requests (e.g., Amazon Music, Pandora, Spotify, iHeart, etc.), a video domain speechlet 442 which may handle intents associated with video play requests (e.g., Amazon Video, HBO, Netflix, Hulu, etc.), a household organization domain speechlet 442 which may handle intents associated with household activities (e.g., calendars, reminders, timers, etc.), a smart home domain speechlet 442 which may handle intents associated with controlling smart devices (e.g., controlling lights, door locks, home monitoring, etc.), an automotive domain speechlet 442, a shopping domain speechlet 442 which may handle shopping requests (e.g., making a shopping list, ordering items online, etc.), and/or a weather domain speechlet 442 which may handle requests for weather forecasts (e.g., providing a URL to a weather website, providing weather related images and/or videos, etc.).

After the domain speechlet 442 generates the appropriate command based on the intent of the user 104, and/or provides additional content, such as audio data, to be output by one of the voice-enabled devices 108 (e.g., "we have hung up your phone call"), the domain speechlet 442 may provide this information back to the speech system 110, which in turns provides some or all of this information to a text-to-speech (TTS) engine 444. The TTS engine 444 then generates an actual audio file for outputting the second audio data determined by the domain speechlet 442 (e.g., "we have hung up your phone call", or "we have turned off your alarm . . . "). After generating the file (or "audio data"), the TTS engine 444 may provide this data back to the speech system 110.

The speech system 110 may then publish (i.e., write) some or all of this information to an event bus 446. That is, the speech system 110 may provide information regarding the initial request (e.g., the speech, the text, the domain/intent, etc.), the response to be provided to the voice-enabled device 108 (e.g., the command to hang up a phone call, the command to turn off an alarm, etc.), or any other information pertinent to the interaction between the voice-enabled device 108(1) and the speech processing system 110 to the event bus 446.

Within the speech processing system 110, one or more components or services may subscribe to the event bus 446 so as to receive information regarding interactions between user devices and the speech processing system 110. In the illustrated example, for instance, the device management component 448 may subscribe to the event bus 446 and, thus, may monitor information regarding these interactions. In some examples, monitoring information in the event bus 446 may comprise communications between various components of the speech processing system 110. For example, the targeting component 134 may monitor the event bus 446 to identify device state data for voice-enabled devices 108. In some examples, the event bus 446 may "push" or send indications of events and/or device state data to the targeting component. Additionally, or alternatively, the event bus 446 may be "pulled" where the targeting component 134 sends requests to the event bus 446 to provide an indication of device state data for a voice-enabled device 108. The event bus 446 may store indications of the device states for the devices 108, such as in a database (e.g., user registry 136), and using the stored indications of the device states, send the device state data for voice-enabled devices 108 to the targeting component. Thus, to identify device state data for a device 108 and/or 112, the targeting component 134 may send a request to the event bus 446 (e.g., event component) to provide an indication of the device state data associated with a device 108 and/or 112, and receive, from the event bus 446, the device state data that was requested.

The device management component 448 functions to monitor information published to the event bus 446 and identify events that may trigger action. For instance, the device management component 448 may identify (e.g., via filtering) those events that: (i) come from voice-enabled devices 108 that are associated with secondary device(s) 112 (e.g., have secondary devices 112 in their environments such as televisions, personal computing devices, etc.), and (ii) are associated with supplemental content (e.g., image data, video data, etc.). The dev device management component 448 may reference the user registry 136 to determine which voice-enabled devices 108 are associated with secondary devices 112, as well as determine device types, states, and other capabilities of these secondary devices 112. For instance, the device management component 448 may determine, from the information published to the event bus 446, an identifier associated with the voice-enabled device 108 making the corresponding request or the voice-enabled device 108 selected to respond to the speech utterance 106. The device management component 448 may use this identifier to identify, from the user registry 136, a user account associated with the voice-enabled device 108. The device management component 448 may also determine whether any secondary devices 112 have been registered with the identified user account, as well as capabilities of any such secondary devices 112, such as how the secondary devices 112 are configured to communicate (e.g., via WiFi, short-range wireless connections, etc.), the type of content the devices 112 are able to output (e.g., audio, video, still images, flashing lights, etc.), and the like.

The device management component 448 may determine whether a particular event identified is associated with supplemental content. That is, the device management component 448 may write, to a datastore, indications of which types of events and/or which primary content or responses are associated with supplemental content. In some instances, the speech processing system 110 may provide access to third-party developers to allow the developers to register supplemental content for output on secondary devices for particular events and/or primary content. For example, if a voice-enabled device 108 is to output that the weather will include thunder and lightning, the device management component 448 may store an indication of supplemental content such as thunder sounds, pictures/animations of lightning and the like. In another example, if a voice-enabled device 108 is outputting information about a particular fact (e.g., "a blue whale is the largest mammal on earth . . . "), then a secondary device 112, such as television, may be configured to provide supplemental content such as a video or picture of a blue whale. In these and other examples, the device management component 448 may store an association between the primary response or content (e.g., outputting of information regarding the world's largest mammal) and corresponding supplemental content (e.g., the audio data, image data, or the like). In some instances, the device management component 448 can also indicate which types of secondary devices are to output which supplemental content. For instance, in the instant example, the device management component 448 may store an indication that secondary devices 112 of a class type "tablet" are to output a picture of a blue whale. In these and other instances, meanwhile, the device management component 448 may store the supplemental content in association with secondary-device capabilities (e.g., devices with speakers output the audio commentary, devices with screens output the image, etc.).

Finally, the device management component 448 may determine how to transmit response and/or supplement content (and/or information acquiring the content) to the voice-enabled devices 108 and/or the secondary devices 112. To make this determination, the device management component 448 may determine a device type of the voice-enabled devices 108 and/or secondary devices 112, capabilities of the device(s), or the like, potentially as stored in the user registry 136. In some instances, the device management component 448 may determine that a particular device is able to communicate directly with the speech processing system 110 (e.g., over WiFi) and, thus, the device management component 448 may provide the response and/or content directly over a network 118 to the secondary device 112 (potentially via the speech system 110). In another example, the device management component 448 may determine that a particular secondary device 112 is unable to communicate directly with the speech processing system 110, but instead is configured to communicate with a voice-enabled device 108 in its environment over short-range wireless networks. As such, the device management component 448 may provide the supplement content (or information) to the speech system 110, which in turn may send this to the voice-enabled device 108, which may send the information over a short-range network to the secondary device 112.

The computer-readable media 402 may further include the user registry 136 that includes data regarding user profiles as described herein. The user registry 136 may be located part of, or proximate to, the speech processing system 110, or may otherwise be in communication with various components, for example over the network 118. The user registry 136 may include a variety of information related to individual users, accounts, etc. that interact with the voice-enabled devices 108, and the speech processing system 110. For illustration, the user registry 136 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 136 may store indications of associations between various voice-enabled devices 108 and/or secondary device 112, such as virtual clusters of devices. The user registry 136 may represent clusters of devices 108 and/or 112 as single devices that can receive commands and disperse the commands to each device 108 and/or 112 in the cluster. In some examples, the virtual cluster of devices may be represented as a single device which is determined as being capable, or not capable (e.g., offline), of performing a command in a speech utterance. A virtual cluster of devices may generally correspond to a stored grouping of devices, or a stored association between a group of devices.

In some examples, the device state for devices associated with a user account may indicate a current state of the device, such as voice-enabled devices 108(1) and 108(2). In this way, the command processor 140 and/or the domain speechlets 442 may determine, based on the stored device states in the user registry 136, a current device state of the voice-enabled devices 108. Rather than receiving device states for the voice-enabled devices 108, in metadata 116, the devices states may already have been determined or received and stored in the user registry 136. Further, the user registry 136 may provide indications of various permission levels depending on the user. As an example, the speech system 110 may perform speaker recognition on the audio signals 114 to determine an identity of the speaker. If the speaker is a child for instance, the child profile may have permission restrictions where they are unable to hang up a phone call of a parent, for example. Conversely, a parent profile may be able to hang up a phone call involving a child profile, or change channel on a television when a child profile is also detected as watching the television.

In some examples, to determine the device state, the event bus 446 may publish different events which indicate device states to various entities or components that subscribe to the event bus 446. For instance, if an event of "set an alarm" occurs for a voice-enabled device 108, the event bus 446 may publish the indication of this event, and thus the device state of an alarm is set for the voice-enabled device 108. Thus, various components, such as the targeting component 134, may be provided with indications of the various device states via the event bus 446. The event bus 446 may further store and/or update device states for the voice-enabled devices 108 in the user registry 136. The components of the speech processing system 110 may query the user registry 136 to determine device states.

A particular user profile may include a variety of data that may be used by the system 110. For example, a user profile may include information about what voice-enabled device 108 are associated with the user 104. The user profile may further indicate an IP address for each of the devices associated with the user 104, user IDs for each of the devices, indicates of the types of devices, and current device states for the devices.

As used herein, a processor, such as processor(s) 120, 200, and/or 400, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 120, 200, and/or 400 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 120, 200, and/or 400 may possess its own local memory, which also may store program components, program data, and/or one or more operating systems.

As described herein, computer-readable media 122, 210, and/or 402 may include volatile and nonvolatile memory, removable and non-removable media implemented in any method or technology for storage of information, such as computer-readable instructions, data structures, program component, or other data. Such computer-readable media 122, 210, and/or 402 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 122, 200, and/or 400 to execute instructions stored on the computer-readable media 122, 210, and/or 402. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 122, 210, and/or 402, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Each of the network interface(s) 228 and network interface(s) 450 may enable communications between the voice-enabled devices 108 and the speech processing system 110, as well as other networked devices. Such network interface(s) can include one or more network interface controllers (NICs) or other types of transceiver devices to send and receive communications over a network.

For instance, each of the net network interface(s) 228 and network interface(s) 450 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 228 and network interface(s) 450 may include a wide area network (WAN) component to enable communication over a wide area network. The network 118 may represent an array of wired networks, wireless networks, such as WiFi, or combinations thereof.

Figure 5:
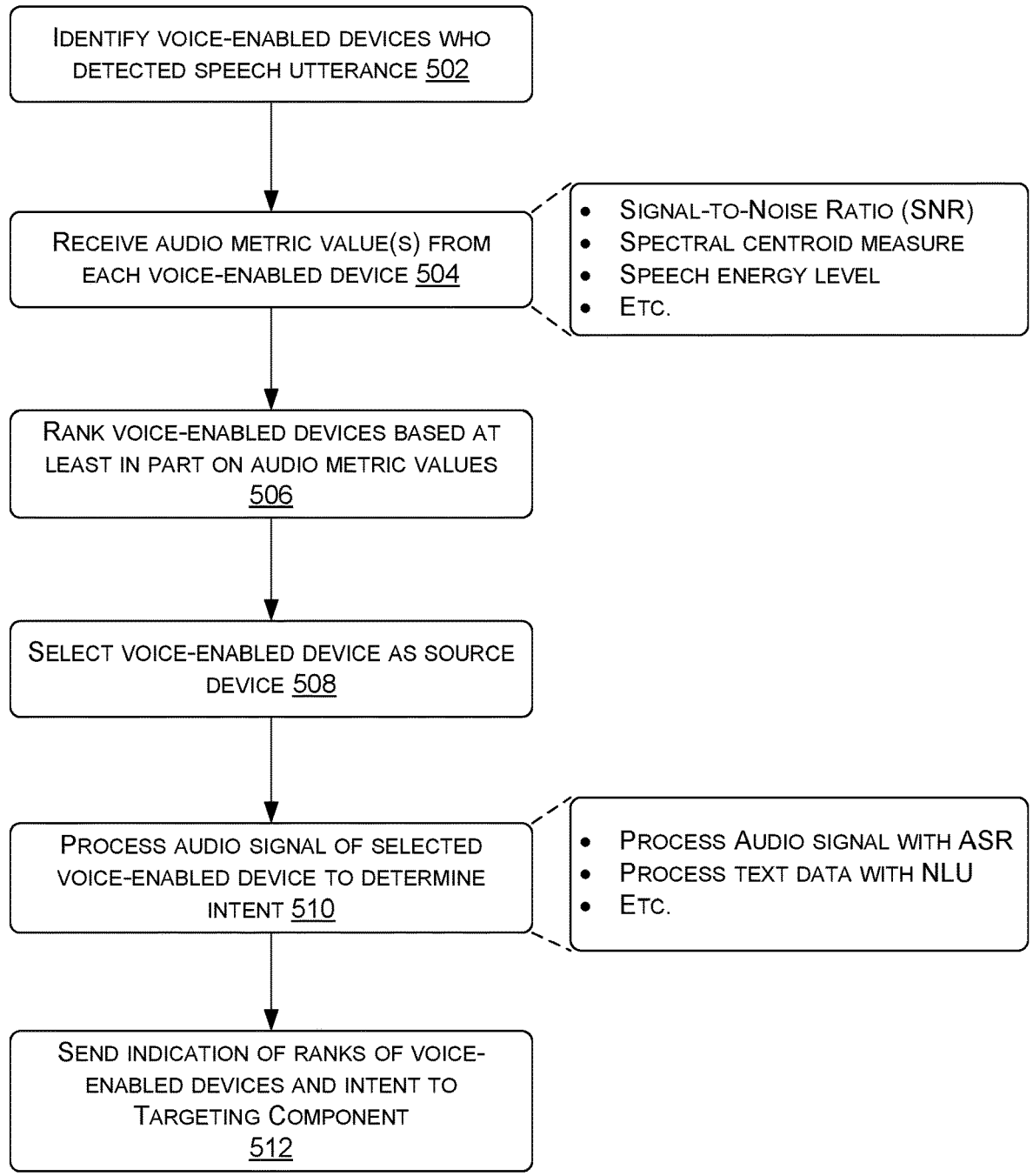
FIG. 5 illustrates a flow diagram of an example method for ranking voice-enabled devices which detected a speech utterance of a user based on various audio signal metrics of audio signals captured by each voice-enabled device.

FIG. 5 illustrates a flow diagram of an example method 500 for ranking voice-enabled devices 108 which detected a speech utterance 106 of a user 104 based on various audio signal metric values 116 of audio signals 114 captured by each voice-enabled device 108. In some examples, some or all of the step of method 500 may be performed by components of the speech processing system 110, such as the orchestration component 124, arbitration component 130, targeting component 134, etc.

At 502, the arbitration component may identify multiple voice-enabled devices 108 that detected the speech utterance 106. This may include identifying (or determining) a first voice-enabled device 108 and a second voice-enabled device 108 that received audio input at substantially a same time (within a threshold amount of time of each other) from a single utterance 106.

At 504, the speech processing system 110 may receive one or more audio signal metric values 116 from each voice-enabled device 108. An audio signal metric value 116 may be for a beamformed audio signal associated with audio input that is received at a voice-enabled device 108. An audio signal metric value 116 may include a signal-to-noise ratio, a spectral centroid measure, a speech energy level (e.g., a 4 Hz modulation energy), a spectral flux, a particular percentile frequency (e.g., $90^{th}$ percentile frequency), a periodicity, a clarity, a harmonicity, and so on. In one example, the operation 504 may include receiving an audio signal metric value 116 that has a best value from among a plurality of audio signal metric values 116, where each of the plurality of audio signal metric values is associated with a different beamformed audio signal determined by a voice-enabled device 108. The audio signal metric value 116 with the best value may be the audio signal with the highest (greatest) value. Alternatively, the audio signal metric value 116 with the best value may be the audio signal with the lowest (smallest) value. In another example, the operation 504 may include receiving an average audio signal metric value from among a plurality of audio signal metric values 116 for a voice-enabled device 108. In yet another example, the operation 504 may include receiving a plurality of audio signal metric values 116 for a voice-enabled device 108. In some instances, an audio signal metric value 116 may be weighted, such as by a difference between an audio signal metric value with a best value (highest value or, in some instances, lowest value) and an audio signal metric value 116 with a worst value (lowest value or, in some instances, highest value) from among a plurality of audio signal metric values 116 for a voice-enabled device 108.

At 506, the arbitration component 130 may rank the multiple voice-enabled devices 108 to create a ranked list of devices 132. The operation 506 may be based on audio signal metric values 116 for individual ones of the multiple voice-enabled devices 108. In some instances, a voice-enabled device 108 may be ranked multiple times for different audio signal metric values 116, different techniques of ranking, and so on. In some examples, other types of data other than audio metric values may be used to rank the voice-enabled devices. For instance, rather than detecting a wake-word, a voice-enabled device 108 may receive another input (e.g., a push of a button, a gesture, etc.) which may affect a ranking of the voice-enabled device 108 that received the input. For instance, a voice-enabled device 108 which received a button input may have an additional weighting factor applied to its rank to increase its rank as a button input indicates that the user 104 wants that particular voice-enabled device 108 to perform the action for the voice command 106. In various examples, other types of data may be used to rank the voice-enabled devices 108. For example, proximity data detected using the proximity detection devices 206 may be used and voice-enabled devices 108 may be ranked higher or lower based on a distance between each of the voice-enabled devices 108 and the user 104. Further, image data obtained by the imaging device 208 may be used to rank the voice-enabled devices 108. For instance, it may be determined that image data captured by one of the voice-enabled devices 108 shows the face of the user 104 facing the particular voice-enabled device 108 (e.g., using object recognition techniques). The particular voice-enabled device 108 that the user 104 is facing may have its ranked increased based on the user 104 facing the particular voice-enabled device 108. Other types of data may be used here to rank the voice-enabled devices in addition, or in lieu of, the audio metric values.

At 508, the arbitration component 130 may select a voice-enabled device 108 to serve as a source device. As one example, the arbitration component 130 may select a voice-enabled device 108 that appears at the top of the ranked list of devices 132. As another example, the arbitration component 130 may select a voice-enabled device 108 that appears most in a top N number of places in the ranked list of devices 132, where N is an integer greater than 2.

In some examples, once the source device is selected, the other voice-enabled devices 108 which detected the speech utterance 106 may be instructed to stop streaming audio data corresponding to the speech utterance 106. Thus, the source device may continue streaming the audio signal 114 or audio data representing the speech utterance 106 to the speech processing system 110 as a conversation or other sound is detected in the environment. However, once a source device is identified, the other devices 108 which previously were streaming audio signals 114 corresponding to the sound may be "turned off" or instructed to stop sending the audio data. In this way, the source device may send additional or more audio data than the other voice-enabled devices 108 which detected the speech utterance 106. The audio data or signals 114 sent from the other voice-enabled devices 108 (not the source device) may have sent audio signals 114 that represent a portion of the sound in the environment 102, but less than all of the sound captured in the audio signal 114 of the source device. In some examples, the source device may stream audio signals 114 which are easier to use or more effective to use when performing ASR and NLU.

At 510, the orchestration component 124 may orchestrate the processing of an audio signal 114 of a selected voice-enabled device 108. In some instances, the orchestration component 124 may call or otherwise cause the ASR component 126 and NLU component 128 to process the audio signal 114 to determine an intent expressed in the speech utterance 106 represented by the audio signal 114.

At 512, an indication of ranks of voice-enabled devices 108 (e.g., ranked list of devices 132) and the intent may be sent to the targeting component 134.

Figure 6A:
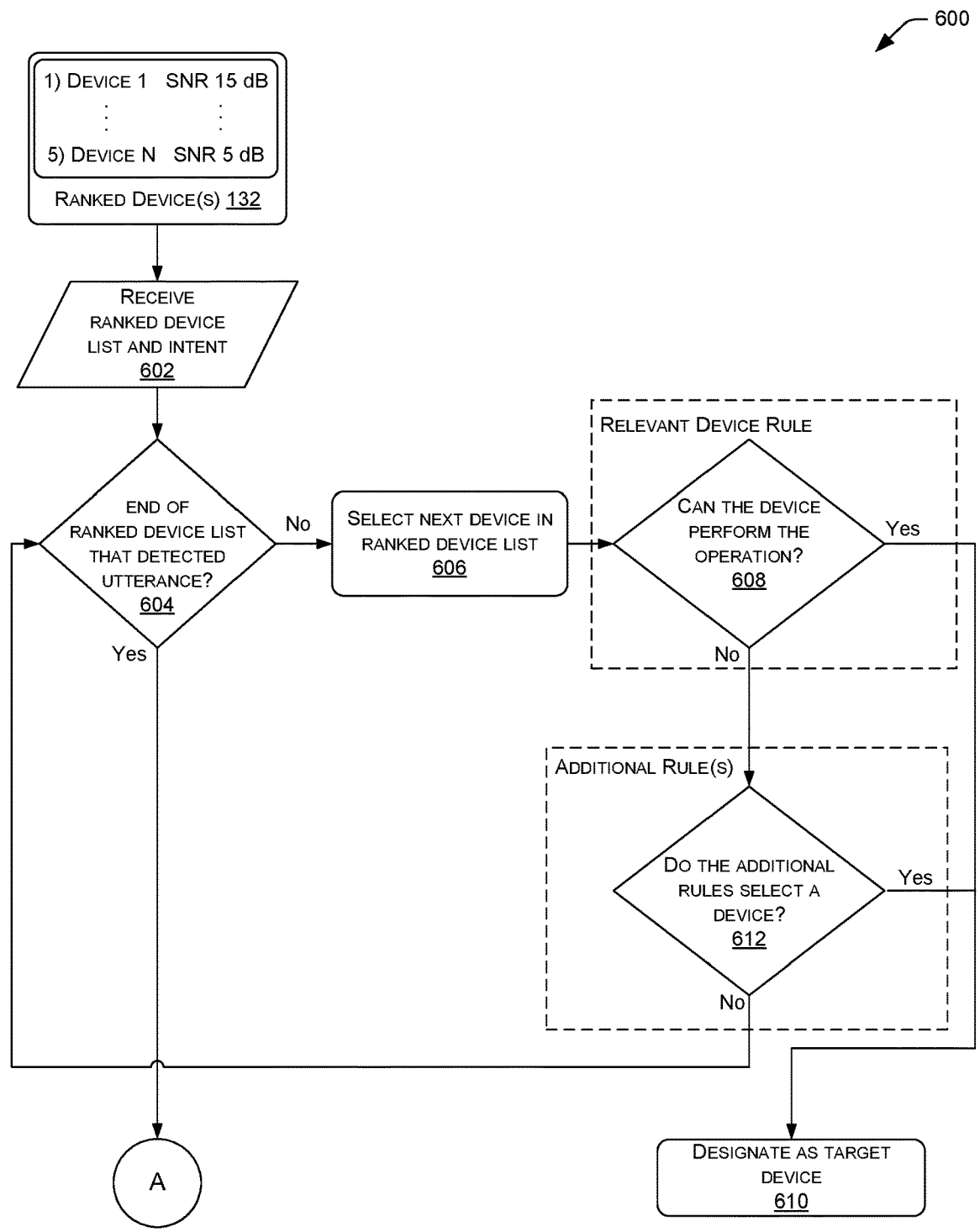
FIGS. 6A and 6B illustrate a flow diagram of an example method for arbitrating, by a speech processing system, between multiple voice-enabled devices to determine which voice-enabled device is to respond to a speech utterance of a user.
Figure 6B:
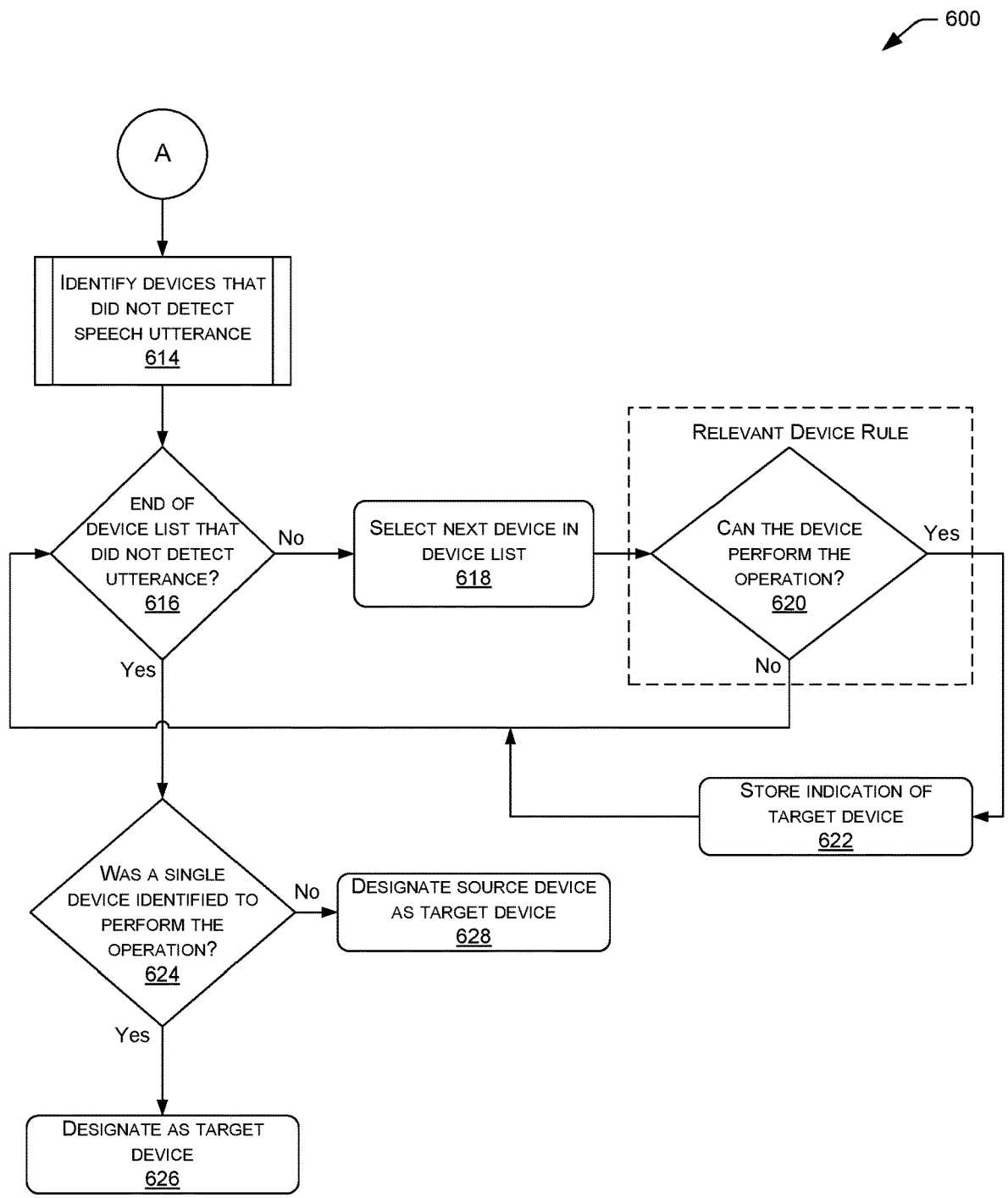

FIGS. 6A and 6B illustrate a flow diagram of an example method 600 for arbitrating, by a speech processing system 100, between multiple voice-enabled devices 108 to determine which voice-enabled device 108 is to respond to a speech utterance 106 of a user 104. The order in which the operations or steps are described is not intended to be construed as a limitation, and any number of the described operations may be combined in any order and/or in parallel to implement method 600.

At 602, the targeting component 134 may receive a ranked list of devices 132 and an intent. The ranked list of devices 132 may be received from the arbitration component 130, and be ranked based on audio signal metric values 116. The intent may be received from the orchestration component, and determined using the ASR component 126 and NLU component 128. The ranked list of devices 132 may include voice-enabled devices 108 that detected a speech utterance 106.

At 604, the targeting component 134 may determine whether the method 600 has analyzed all of the voice-enabled devices 108 that detected the speech utterance 106. If the targeting component 134 determines that the method 600 has not reached the end of the ranked list of devices 132, the targeting component 134 may proceed to 606.

At 606, the targeting component 134 may select the next device in the ranked device list 132. At the beginning of the method 600, the targeting component 134 may select the voice-enabled device 108(1) in the list (e.g., the top ranked device in the ranked list of devices 132, or "source device").

At 608, the targeting component 134 may determine, during a first iteration, using a first relevant device rule whether the top ranked voice-enabled device 108(1) ("source device") in the ranked list is capable of responding to the command in the speech utterance 106. The targeting component 134 may analyze the intent expressed in the speech utterance 106, as well as the device state, to determine whether the source device is capable of responding to the command in the speech utterance 106. For example, if the speech utterance 106 is to "please stop," the intent may map to devices states which are capable of "stopping" their device state, such as device states of steaming audio, conducting a phone call, outputting an alarm sound, etc.

In various examples, "mapping" between different data (e.g., intents, device states, device identifiers, etc.) may generally correspond to an association in memory or a database between two pieces of data. For instance, a mapping between a particular intent and a particular device state may indicate that the particular intent and the particular device state are indicated as being associated with each other, via any technique known in the art, in a database or other memory structure (e.g., associated in a table, associated by a pointer, etc.).

In some examples, the targeting component 134 may determine that a voice-enabled device 108 is unable to, or is incapable of, responding to the command in the speech utterance 106. For instance, if the voice-enabled device 108 is in offline (e.g., idle), or in an offline state or idle state, the voice-enabled device 108 may be unable to change volume of audio being output. In some examples, a voice-enabled device 108 may be considered offline when the voice-enabled device 108 is not performing user requested actions (e.g., the voice-enabled device 108 is not outputting audio, outputting video, performing a dialog, etc.).

Using the first rule at 608, if the intent of the speech utterance 106 maps to the device state of the source device, or is "relevant" to the device state of the source device, the targeting component 134 may determine at 610 that the source device is capable of performing the response to the command and select the source device as the voice-enabled device 108 that is to respond to the command in the speech utterance ("target device"). Thus, the targeting component 134 may designate the source device as the target device, and store an indication that the source device is the target device. The targeting component 134 may then send an indication to the command processor 140 that the source device is the target device at 610.

Alternatively, if the intent expressed in the speech utterance 106 does not map to the device state of the source device, the targeting component 134 may proceed one or more additional rules and determine, at 612, whether the additional rules select a device. In some examples, the additional rules used at 612 may include determining if the source is device is part of a device "cluster of devices" that has a device state to which the intent maps, or otherwise corresponds. A cluster of devices may correspond to a virtual representation or indication of a group of voice-enabled devices which are synchronized to perform the same action in concert. For instance, the cluster of devices may include multiple voice-enabled devices 108 which are outputting the same audio stream in a uniform fashion such that the different audio streams, which correspond to the same audio content, being output by each of the voice-enabled devices is in sync with each other. The cluster of devices may be stored as a virtual representation such that all of the voice-enabled devices in the cluster appear to be a single device from the perspective of the targeting component. Accordingly, in a similar fashion to the first rule, the targeting component 134 may determine whether the cluster of devices can respond to the command in the speech utterance 106.

At 612, the targeting component 134 may determine if the intent of the speech utterance 106 maps to the device state of the cluster of devices, or is "relevant" to the device state of the cluster of devices. If the targeting component 134 determines that the cluster of devices can perform the response to the command, the targeting component 134 may select the cluster of devices as the target device at 610.

While several examples of additional rules that could be used at 612 to identify a device are described, any other type of rules for determining whether a device is to respond to a command based on device state data and intent data may be used.

Alternatively, at 612 if the targeting component 134 determines that the source device is not included in a cluster of devices, or at 614 if the targeting component 134 determines that the cluster of devices in which the source device is included is not capable of performing the respond to the command in the speech utterance, the targeting component 134 may, at 612, apply a third rule and determine whether the source device is associated with a secondary device 112 that is capable of performing the response to the command. As described herein, a secondary device 112 may comprise another device that is controlled, or otherwise associated with, a voice-enabled device 108. For example, types of secondary devices 112 may include, but are not limited to, televisions, lamps/lights, garage doors, door locks, thermostats, garbage disposals, etc.

At 612, if the targeting component 134 determines at that the source device is associated with a secondary device 112, the targeting component 134 may determine whether the intent maps to a device state of the secondary device 112. If the targeting component determines that the secondary device 112 is capable of performing the response to the command, the targeting component 134 may select the source device as the target device at 610. For example, if the source device is associated with a secondary device 112, such as controlling a television based on voice commands from a user 104, and the command is "next channel," the targeting component 134 may select the source device as the target device at 610 because the secondary device 112 with which the source device is associated is capable of performing the command in the speech utterance 106.

However, if the targeting component 134 determines at 612 that the source device is not associated with a secondary device 112, or if the targeting component 134 determines at 612 that secondary device 112 with which the source device is associated is not capable of performing the command, the targeting component 134 may determine that the source device is not the target device.

If the targeting component 134 determines that the source device is not the target device, the targeting component 134 may return to 604 and determine whether all of the voice-enabled devices 108 have been analyzed. If the targeting component 134 determines that not all of the devices on the ranked list of devices 132 have been analyzed, the targeting component 134 may iteratively use the above described rules 606-618 of method 600 to determine whether the other voice-enabled devices 108 indicated in the ranked list 132 are the target device. The targeting component 134 may move through the ranked list of devices 132 in order to determine whether any of the voice-enabled devices 108 which detected the speech utterance 106 are the target device.

If the targeting component 134 determines at 604 that all of the voice-enabled devices 108 on the ranked list of devices 132 have been analyzed, the targeting component 134 may proceed to 614.

At 614, the targeting component 134 may identify all other voice-enabled devices 108 associated with the user and/or household account that did not detect the speech utterance. For instance, the targeting component 134 may analyze the user registry 136 to identify devices in the device indications 138 to identify devices associated with the user and/or household account that did not detect the speech utterance 106.

At 616, the targeting component 134 may determine whether all of the other devices 108 have been analyzed to determine whether they are capable of responding to the command in the speech utterance 106. At 618, the targeting component 134 may determine whether the method 600 has analyzed all of the other voice-enabled devices 106 which did not detect the speech utterance 106.

At 620, if the targeting component 134 determines that other voice-enabled devices 108 remain to be analyzed, the targeting component 134 may determine whether the intent expressed in the speech utterance 106 maps to, or is otherwise associated with, a remaining voice-enabled device 108. If the intent maps to a device state of a voice-enabled device, the targeting component 134 may store an indication that the voice-enabled device is a target device at 622.

The targeting component 134 may then iteratively move through steps 616-620 for each of the remaining voice-enabled devices 108 that did not detect the speech utterance, and store indications at 622 that a particular voice-enabled device 108 is a target device.

If the targeting component 134 determines at 6216 that all of the other voice-enabled devices 108 which did not detect the speech utterance 106 have been analyzed, the targeting component 134 may proceed to 624 and determine whether a single voice-enabled device was identified to perform the operation. If only a single voice-enabled device was identified as being capable of performing the operation or command, the targeting component 134 may designate this device 108 as the target device, and provide this indication to the command processor 140.

Alternatively, if the targeting component 134 determines at 624 that more than one voice-enabled device 108 has been indicated as being capable of performing the operation, the targeting component 134 may designate the source device as the target device and provide this indication to the command processor 140. The command processor 140 may then generate output audio data to be sent to the source device which indicates to the user 104 that the speech processing system 110 was unable to determine how to perform the requested operation.

Thus, the techniques described herein include analyzing contextual data using various rules for to determine which voice-enabled device is intended and/or capable of responding to a command issued in a speech utterance 106 of a user 104.

Once the targeting component has determined the target device, the targeting component may provide an indication of the target device to a command processor. The command processor may use the intent and the indication of the target device to determine a response for the processed speech utterance. For instance, the command processor may work in conjunction with one or more speechlets that are configured to determine a response for the processed query, determine locations of relevant information for servicing a request from the user 102 and/or generate and store the information if it is not already created, as well as route the identified intents to the appropriate destination command processor. The destination command processor may be determined based on the intent determined using the NLU. For example, if the NLU output includes a command to play music (play music intent), the destination command processor may be a music playing application, such as one located on the target voice-enabled device, or in a music playing appliance, configured to execute a music playing command. The command processor may then cause the determined command to be sent to the target device to cause the target device to perform the appropriate response for the command.

In some examples, the speech processing system may determine various types of operations for the devices 108 to perform. For instance, the command processor 140 may generate a command to cause the voice-enabled devices and/or secondary devices 112 to change from a first state to a second state (e.g., change the volume of audio output, change a channel on a television, open a garage door, etc.). Additionally, or alternatively, the text-to-speech engine 444 may be employed by the command processor to generate text to be output as audio by a device. For instance, the text-to-speech engine 444 may generate an audio output to be sent to the source device to indicate to the user that their command has been processed (e.g., "the volume on your device has been lowered"). The audio output may be sent to the source device, and a command to cause a voice-enabled device 108 to change states may also be sent to the target device, which may also be the source device.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors;
   computer-readable media storing computer-executable instructions that, when executed by the one or more processors, cause the one or more processors to perform operations comprising:
     receiving, from a first voice-enabled device, first audio data representing a speech utterance;
     receiving, from the first voice-enabled device, a first audio signal metric value indicating a first signal-to-noise ratio associated with the first audio data;
     receiving, from a second voice-enabled device, second audio data representing the speech utterance;
     receiving, from the second voice-enabled device, a second audio signal metric value indicating a second signal-to-noise ratio associated with the second audio data;
     determining that the first signal-to-noise ratio is greater than the second signal-to-noise ratio;
     identifying device state data associated with the first voice-enabled device;
     generating, using automatic speech recognition (ASR) on at least one of the first audio data or the second audio data, text data corresponding to the speech utterance;
     determining, using natural language understanding (NLU) on the text data, intent data associated with the speech utterance, the intent data representing a request for a client device to perform an action;
     determining, based at least in part on the device state data, that the first voice-enabled device is capable of performing the action responsive to the speech utterance;
     determining a command to cause the first voice-enabled device to perform the action; and
     sending, to the first voice-enabled device, data indicating the command.

2. The system of claim 1, the operations further comprising causing the second voice-enabled device to stop transmitting the second audio data, the second voice-enabled device being stopped from transmitting the second audio data prior to the first voice-enabled device stopping transmitting the first audio data,
   wherein generating the text data is performed using ASR on the first audio data.

3. The system of claim 1, the operations further comprising:
  determining that the first voice-enabled device is included in a stored grouping of devices that includes the first voice-enabled device and a third voice-enabled device;
  identifying device state data associated with the stored grouping of devices; and
  determining that the stored grouping of devices is capable of performing the action responsive to the speech utterance.

4. The system of claim 1, wherein identifying the device state data associated with the first voice-enabled device comprises:
  sending a request to an event component to provide an indication of the device state data associated with the first voice-enabled device; and
  receiving, from the event component, the device state data.

5. A system comprising:
  one or more processors;
  computer-readable media storing computer-executable instructions that, when executed by the one or more processors, cause the one or more processors to perform operations comprising:
    receiving a first device identifier of a first device;
    receiving first audio data associated with the first device identifier, the first audio data representing a speech utterance;
    receiving a second device identifier of a second device;
    receiving second audio data associated with the second device identifier, the second audio data representing the speech utterance;
    determining intent data associated with the speech utterance, the intent data representing a machine response for a device to perform responsive to the speech utterance;
    identifying first device state data associated with the first device;
    identifying second device state data associated with the second device;
    based at least in part on the second device state data, determining the second device is to be used for the machine response;
    determining command data to cause the second device to perform the machine response; and
    sending, to the second device, the command data to perform the machine response.

6. The system of claim 5, further comprising determining, based on the first device state data, that the first device is offline.

7. The system of claim 5, the operations further comprising:
  determining that the first device is included in a stored grouping of devices that includes the first device and a third device;
  identifying device state data associated with the stored grouping of devices; and
  determining, based on the device state data associated with the stored grouping of devices, that the stored grouping of devices is offline.

8. The system of claim 5, the operations further comprising:
  determining that the first device is associated with a secondary device;
  identifying third device state data associated with the secondary device; and
  determining, based on the third device state data, that the secondary device is offline.

9. The system of claim 5, the operations further comprising:
  determining, based on the first device state data, that the first device is offline; and
  storing an indication that the second device is to perform the machine response.

10. The system of claim 5, the operations further comprising receiving an indication that the first device is ranked higher than the second device based at least in part on a first audio signal metric associated with the first audio data and a second audio signal metric associated with the second audio data.

11. The system of claim 10, wherein:
  the first audio signal metric associated with the first audio data comprises at least one of:
    a first signal-to-noise value of the first audio data;
    a first amplitude of the first audio data; or
    a first level of voice activity in the first audio data; and
  the second audio signal metric associated with the second audio data comprises at least one of:
    a second signal-to-noise value of the second audio data;
    a second amplitude of the second audio data; or
    a second level of voice activity in the second audio data.

12. The system of claim 5, the operations further comprising receiving an indication that the first device is ranked higher than the second device, wherein the first device and the second device are ranked based on one or more of:
  input received via an input control of the first device;
  a distance of a user to the first device; or
  image data indicating that the user is at least partially facing the first device.

13. A method comprising:
  receiving first audio data associated with a first device, the first audio data representing a speech utterance;
  receiving second audio data associated with a second device, the second audio data representing the speech utterance;
  identifying first device state data associated with the first device;
  identifying second device state data associated with the second device;
  determining intent data associated with the speech utterance, the intent data representing a machine response for a device to perform responsive to the speech utterance;
  based at least in part on the second device state data, determining the second device is to be used for the machine response;
  determining command data to cause the second device to perform the machine response; and
  sending, to the second device, the command data to perform the machine response.

14. The method of claim 13, further comprising determining, based on the first device state data, that the first device is offline.

15. The method of claim 13, further comprising:
  determining that the first device is included in a stored grouping of devices that includes the first device and a third device;
  identifying device state data associated with the stored grouping of devices; and
  determining, based on the device state data associated with the stored grouping of devices, that the stored grouping of devices is offline.

16. The method of claim 13, further comprising:
determining that the first device is associated with a secondary device;
identifying third device state data associated with the secondary device; and
determining, based on the third device state data, that the secondary device is offline.

17. The method of claim 13, further comprising:
determining, based on the first device state data, that the first device is offline; and
storing an indication that the second device is to perform the machine response.

18. The method of claim 13, further comprising receiving an indication that the first device is ranked higher than the second device based at least in part on a first audio signal metric associated with the first audio data and a second audio signal metric associated with the second audio data.

19. The method of claim 18, wherein:
the first audio signal metric associated with the first audio data comprises at least one of:
a first signal-to-noise value of the first audio data;
a first amplitude of the first audio data; or
a first level of voice activity in the first audio data; and
the second audio signal metric associated with the second audio data comprises at least one of:
a second signal-to-noise value of the second audio data;
a second amplitude of the second audio data; or
a second level of voice activity in the second audio data.

20. The method of claim 13, further comprising:
generating output audio data representing synthesized speech of output text data, wherein the output text data indicates that the second device is to be used for the machine response; and
sending, to the first device, the output audio data.

* * * * *